United States Patent
Lortscher, Jr.

(10) Patent No.: US 7,720,732 B2
(45) Date of Patent: May 18, 2010

(54) SYSTEM AND METHOD FOR GENERATING TRANSACTION BASED RECOMMENDATIONS

(76) Inventor: Frank D. Lortscher, Jr., 409 N. 27th St., Richmond, VA (US) 23223

( * ) Notice: Subject to any disclaimer, the term of this patent is extended or adjusted under 35 U.S.C. 154(b) by 1549 days.

(21) Appl. No.: 10/762,466

(22) Filed: Jan. 23, 2004

(65) Prior Publication Data

US 2004/0153389 A1 Aug. 5, 2004

Related U.S. Application Data

(60) Provisional application No. 60/441,756, filed on Jan. 23, 2003.

(51) Int. Cl.
*G06Q 99/00* (2006.01)
(52) U.S. Cl. ......................... 705/35
(58) Field of Classification Search ........... 705/35–40
See application file for complete search history.

(56) References Cited

U.S. PATENT DOCUMENTS

| | | | |
|---|---|---|---|
| 5,101,353 A * | 3/1992 | Lupien et al. ............ 705/37 |
| 5,132,899 A | 7/1992 | Fox |
| 5,502,637 A | 3/1996 | Beaulieu et al. |
| 5,761,442 A | 6/1998 | Barr et al. |
| 5,893,079 A | 4/1999 | Cwenar |
| 6,018,722 A | 1/2000 | Ray et al. |
| 6,175,824 B1 | 1/2001 | Breitzman et al. |
| 6,236,980 B1 | 5/2001 | Reese |
| 6,275,814 B1 | 8/2001 | Giansante et al. |
| 6,317,728 B1 * | 11/2001 | Kane ................ 705/36 R |
| 6,338,047 B1 | 1/2002 | Wallman |
| 6,349,290 B1 | 2/2002 | Horowitz et al. |
| 6,370,516 B1 | 4/2002 | Reese |
| 6,401,080 B1 * | 6/2002 | Bigus et al. ............ 705/37 |
| 6,405,204 B1 | 6/2002 | Baker et al. |
| 6,453,303 B1 | 9/2002 | Li |
| 6,484,152 B1 * | 11/2002 | Robinson ............ 705/36 R |
| 6,493,682 B1 | 12/2002 | Horrigan et al. |
| 6,510,419 B1 | 1/2003 | Gatto |
| 6,832,210 B1 * | 12/2004 | Li ............ 705/36 R |
| 7,299,204 B2 * | 11/2007 | Peng et al. ............ 705/36 R |
| 7,509,274 B2 * | 3/2009 | Kam et al. ............ 705/35 |
| 7,590,587 B2 * | 9/2009 | Duquette ............ 705/37 |
| 2002/0004774 A1 | 1/2002 | Defarlo |
| 2002/0007335 A1 * | 1/2002 | Millard et al. ............ 705/37 |
| 2002/0032630 A1 | 3/2002 | Peng et al. |
| 2002/0059126 A1 * | 5/2002 | Ricciardi ............ 705/36 |

(Continued)

OTHER PUBLICATIONS

Does Historical Performance Predict Future Performance, Kahn, R., Rudd, A., Barra Newsletter Spring 1995.*

*Primary Examiner*—Thu-Thao Havan
*Assistant Examiner*—Thomas M Hammond, III
(74) *Attorney, Agent, or Firm*—Rothwell, Figg, Ernst & Manbeck, pc

(57) ABSTRACT

A system for generating recommendation data includes an assessment unit and an evaluation unit. The assessment unit is configured to receive transaction data for a plurality of transactions and to assess each transaction and generate assessment data based thereon. The evaluation unit is coupled with the assessment unit and configured to receive an evaluation request including a proposed transaction, and generate recommendation data including a certainty indicator which indicates a level of certainty that the proposed transaction will be successful according to predetermined criteria.

14 Claims, 16 Drawing Sheets

U.S. PATENT DOCUMENTS

2002/0116302 A1* 8/2002 Wilmes et al. .............. 705/31
2003/0093352 A1* 5/2003 Muralidhar et al. .......... 705/36
2003/0093353 A1 5/2003 Ward et al.

* cited by examiner

| User ID | Acct ID | Pass Word | Inv Instit | Inv ID | Inv Acct ID | Goals | Risk Level | Exp Level | Test 1 Score | Age | email | User Comp Score | Adv credit | Eval rqsts |
|---|---|---|---|---|---|---|---|---|---|---|---|---|---|---|
| 123 | 001 | blue | SSB | 9123 | 2-178 | Grow | H | M | 94 | 45 | x@yz.com | 55 | 45 | 0 |
| 456 | 001 | hi77 | ML | 465A | 0012 | Grow | M | H | - | 25 | 1@za.com | 84 | 147 | 0 |
| 789 | 001 | 42lo | BA | Y654 | 987J | Inc | L | L | 33 | 70 | A@b.com | 2 | 14 | 0 |
| 789 | 002 | 42lo | - | - | - | G&I | M | L | 33 | 70 | u@pc.com | 10 | 6 | 12 |
| 912 | 001 | win9 | - | - | - | Grow | M | L | 55 | 35 | T@nb.com | 34 | 0 | 23 |

Figure 2

| Trans ID | User ID | Acct ID | Object | Indstry | Action | Quant | Object Status | Date | Time | Tran Strngth | Open Y/N |
|---|---|---|---|---|---|---|---|---|---|---|---|
| 001 | 123 | 001 | AAA | Fin | Buy | 100 | 12.55 | 030102 | 145523 | 2.5 | N |
| 002 | 456 | 001 | BCD | Fin | Buy | 10 | 28.00 | 030103 | 104634 | 0.6 | Y |
| 003 | 456 | 001 | WMT | Retail | Buy | 1000 | 45.25 | 030103 | 104645 | 95.9 | Y |
| 004 | 789 | 002 | AAA | Fin | Short | 500 | 20.10 | 030915 | 123556 | 20.1 | Y |
| 005 | 123 | 001 | AAA | Fin | Sell | 100 | 18.04 | 031014 | 93512 | 100.0 | N |

Figure 3

MetaTrader 1.0

| USER | 912 | ACCT | 001 | PASSWORD | **** |

[SUBMIT NEW REQUESTS]   [REVIEW OLD REQUESTS]

| OBJECT TYPE | OBJECT | INDUSTRY | ACTION | REQ? |
|---|---|---|---|---|
| STOCK ▼ | AAA ▼ | ▼ | BUY ▼ | Y |
| STOCK ▼ | TOP 10 ▼ | RETAL ▼ | BUY ▼ | N |
| GAME ▼ | DLVGB ▼ | NFL ▼ | BET ▼ | N |

[LIST TOP INVESTORS]   [LIST MY RATINGS]

[SUBMIT REQUESTS]

[LIST TOP TRANSACTIONS]   [LIST MY TRANSACTIONS]

| Rule ID | Rule Type | Rule Description | Rule Operation |
|---|---|---|---|
| 001 | SLCT | Select relevant records | Select all records in User Transaction Database with (1) same object or industry or transaction and (2) User ID not equal to User ID of evaluation request. |
| 002 | COMP | Calculate actual gain for open actions | If Trans ID is an "opening" transaction and is "closed" or "partially closed," find closing transaction and calculate actual gain or loss on closed portion, then calculate competence equal to result as a % of dollars at stake in "opening" transaction. Annualize figure. |
| 003 | COMP | Calculate hypothetical gain for open actions | If Trans ID is an "opening" transaction and is "open" or "partially closed," find object status quo and calculate current hypothetical gain or loss on open portion then calculate competence equal to result as a % of dollars at stake in "opening" transaction. Annualize figure. |
| 004 | COMP | Calculate actual gain for closed actions | If Trans ID is a "closing" transaction, find opening transaction and calculate actual gain or loss on closed portion, then calculate competence equal to result as a % of dollars at stake in "opening" transaction. Annualize figure. |
| 005 | COMP | Calculate User comp score | For each User ID and Acct ID with records selected, average above calculated COMP scores and write new value to User Profile Database. |
| 006 | SIML | Calculate account trade activity level | Read all Trans ID for this User ID and calculate mean and median duration of time object was held. (For transactions that remain "open," use current date as end date.) If mean and median are both < 10 days, calculate "SHORT TERM" trading level for User ID. If mean and median are both >100 days, calculate "LONG TERM" trading level. Otherwise calculate "AVERAGE TERM" trading level. |
| 007 | SIML | Calculate user trade activity level | If more than one account for this User ID, repeat Rule ID 006 for SIML to calculate trading level for Acct ID for User ID. If all trading level calculations are similar, that is trading level for transaction. If all are not similar, determine mode. Trading level for transaction will be more aggressive of User ID mode trading level or User ID and Account ID trading level. |
| 008 | SIML | Calculate user skill level from profile | Read User profile for User ID for this Trans ID. If average test scores >80 and Latest Comp Score > 15, calculate "EXPERT" skill level. If average test scores are <40 or if average test scores are <60 and stated experience is "LOW" or if Latest Comp Score < 0, calculate "BEGINNER" skill level. Otherwise calculate "MODERATE" skill level. |
| 009 | CONF | Calculate transaction strength for all records | Read all other Trans ID for this User ID and rank order Transaction Strength values from low to high. If Trans Strength for this Trans ID is in lowest decile, calculate a value of 1, and so on to 10 to calculate overall user confidence. |
| 010 | CONF | Calculate transaction strength for industry | Read all other Trans ID with same Industry for this User ID and rank order Transaction Strength values from low to high. If Trans Strength for this Trans ID is in lowest decile, calculate a value of 1, and so on to 10 to calculate user industry confidence. |
| 011 | CONF | Calculate transaction strength for object | Read all other Trans ID with same Object for this User ID and rank order Transaction Strength values from low to high. If Trans Strength for this Trans ID is in lowest decile, calculate a value of 1, and so on to 10 to calculate user equity confidence. |
| 012 | CONF | Calculate transaction strength for action | Read all other Trans ID with same Action for this User ID and rank order Transaction Strength values from low to high. If Trans Strength for this Trans ID is in lowest decile, calculate a value of 1, and so on to 10 to calculate overall user action confidence. |
| 013 | CONF | Calculate transaction strength for industry and action | Read all other Trans ID with same Industry and Action for this User ID and rank order Transaction Strength values from low to high. If Trans Strength for this Trans ID is in lowest decile, calculate a value of 1, and so on to 10 to calculate user industry action confidence. |
| 014 | CONF | Calculate transaction strength for object and action | Read all other Trans ID with same Object and Action for this User ID and rank order Transaction Strength values from low to high. If Trans Strength for this Trans ID is in lowest decile, calculate a value of 1, and so on to 10 to calculate user equity action confidence. |
| 015 | CONF | Calculate transaction confidence level | Average all resulting confidence values to calculate transaction confidence level, giving double weight to values for the same Acct ID for this User ID. |

Figure 6B

| Trans ID | Trans Date | Trans Time | User ID | Acct ID | Goals | Obj Y/N | Ind Y/N | Act | Open Y/N | Trade Level | User Comp Score | Tran Comp | Conf | Ass Used |
|---|---|---|---|---|---|---|---|---|---|---|---|---|---|---|
| 001 | 030102 | 145523 | 123 | 001 | Grow | Y | Y | Buy | N | LONG | 55 | +70.1 | 8 | Y |
| 002 | 030103 | 104634 | 456 | 001 | Grow | N | Y | Buy | Y | LONG | 84 | +14.6 | 1 | Y |
| 003 | 030103 | 104645 | 456 | 001 | Grow | N | N | Buy | Y | LONG | 2 | -27.3 | 10 | Y |
| 004 | 030915 | 123556 | 789 | 002 | G&I | Y | Y | Short | Y | SHRT | 10 | +13.3 | 5 | Y |
| 005 | 031014 | 93512 | 123 | 001 | Grow | Y | Y | Sell | N | LONG | 34 | +70.1 | 10 | Y |

Figure 7

| Rule ID | Rule Type | Rule Description | Rule Operation |
|---|---|---|---|
| 001 | SLCT | Select most relevant and successful records | Select all records in Completed Assessments Database with (1) same object (if object specified in request) or same industry (if only industry specified in request) as evaluation request and (2) user competence > 25 and confidence >7 and (3) user goals from transaction are the same as user goals from the evaluation request and (4) transaction date < 2 years old and (5) action is same or opposite of evaluation request and (6) action is open. If number of records selected >1000, go to rule 004. If not, go to rule 002. |
| 002 | SLCT | If not enough records, lower standards | Select additional records in Completed Assessments Database with (1) same object (if object specified in request) or same industry (if only industry specified in request) as evaluation request and (2)user competence > 10 and confidence >6 and (3) action is same or opposite of evaluation request and (4) action is open. If number of records selected >1000 or if evaluation is not for a specific object, go to rule 004. If < 1000 and if evaluation is for object, go to rule 003. |
| 003 | SLCT | If still not enough records, lower standards | Repeat rule 001 and then 002 (if needed), selecting records for the industry associated with the object. |
| 004 | EXPT | Calculate expertise components | Add user competence value to the transaction competence rating to calculate the transaction component of the evaluation expertise rating, using maximum value of 1000, then divide by 10. If record was selected during rule 003, reduce value by 50%. If transaction date is > 1 year old, reduce value by 10%. |
| 005 | EXPT | Calculate expertise | Sum all values and divide by the number of records to calculate the overall evaluation expertise rating. |
| 006 | CONV | Calculate conviction components | For each selected record, assign values to the trade level according to Long = 8, Medium = 5 and Short = 1. Add this value to the transaction confidence rating to calculate the transaction component of the evaluation conviction rating. If transaction date is < 1 month old, reduce value by 10%. If action is opposite of evaluation request, multiply by -1. |
| 007 | CONV | Calculate conviction | Sum all values and divide by the number of records to calculate the overall evaluation conviction rating. |
| 008 | CERT | Calculate certainty components | For each selected record, multiply the transaction component of the evaluation expertise rating by the transaction component of the evaluation conviction rating. Sum all values and divide by the number of records to calculate the initial overall evaluation certainty rating. Also calculate and compare the mean and the median. |
| 009 | CERT | Calculate certainty | Calculate the final evaluation certainty rating by adjusting the initial rating according to four criteria. (1) If rule 002 was consulted, subtract 5%. (2) If rule 003 was consulted, subtract 5%. (3) If the final number of records used was < 1000, subtract 10%. (4) If in rule 008 the mean > median, subtract the % of the median by which the mean was greater, but if mean < median, then add the % of the median by which the mean was less. |

Figure 9B

| Eval ID | Eval Date | Eval Time | User ID | Acct ID | Object | Action | Status | Eval Expt | Eval Conv | Eval Cert | Eval Sent | Eval Rwd | Eval Used |
|---|---|---|---|---|---|---|---|---|---|---|---|---|---|
| 001 | 030102 | 145523 | 123 | 001 | AAA | BUY | 14.00 | 26.3 | 12.1 | 157 | Y | N | N |
| 002 | | | | | | | | | | | | | |
| 003 | | | | | | | | | | | | | |

Figure 10

| Comm ID | Comm Type | Eval ID | Content | User ID | Acct ID | Date | Time |
|---|---|---|---|---|---|---|---|
| 001 | EVAL | 001 | Eval | 912 | 001 | 031215 | 145538 |
| 002 | ALRT | 001 | Low | 912 | 001 | 031215 | 145538 |
| 003 | ALRT | 001 | Other | 912 | 001 | 031215 | 145538 |
| 004 | | | | | | | |

Figure 11

MetaTrader 1.0

| SUBMIT NEW REQUESTS | USER 912 | ACCT 001 | REVIEW OLD REQUESTS |

| EVAL ID | DATE | TIME | OBJECT | INDUSTRY | STATUS | ACTION | CERTAIN |
|---|---|---|---|---|---|---|---|
| 001 | 031215 | 145523 | AAA | | 14.00 | BUY | 157 |
| | | | | | | | |

USER NOTES
EVAL ID 001: Low rates of similar user activity have contributed to this evaluation.
EVAL ID 001: Higher certainty transactions for this industry are available! Try our "Top Ten" Lists.

Certainty Guidelines:
1000-800 Strongly Recommended
799-600 Recommended
599-400 Not Recommended
< 400 Strongly Not Recommended

LINK TO BROKER TO MAKE A TRANSACTION

MetaTrader 1.0

| SUBMIT NEW REQUESTS | USER | 912 | ACCT | 001 | REVIEW OLD REQUESTS |

| EVAL ID | DATE | EQUITY | INDUSTRY | STATUS | ACTION | CERTAIN |
|---|---|---|---|---|---|---|
| 001 | 031215 | AAA | | ??? | BUY | ?? |

CALCULATED EXPERTISE [ ??? ]    CALCULATED CONVICTION [ ??? ]

| USER ID | ACCT ID | COMP | IND COMP | IND POS | EQ COMP | EQ POS | ACT COMP |
|---|---|---|---|---|---|---|---|
| 123 | 001 | 55 | 90 | ZERO | 90 | ZERO | 85 |
| 456 | 001 | 84 | N/A | PLUS | N/A | MINUS | 72 |
| 789 | 002 | 10 | 20 | MINUS | N/A | MINUS | 39 |

| MORE | | RETURN TO REQUESTS |

| Object ID | Object Type | Common Name | Characteristic 1 | Characteristic 2 | Characteristic 3 | Characteristic 4 |
|---|---|---|---|---|---|---|
| 123 | Stock | AAA | Mid Cap | Finance | | |
| 456 | Stock | BFG | Large Cap | Retail | | |
| 789 | Gaming | Packers at Bears 12-10-04 | Professional | Football | Playoffs | National Conference |
| 321 | Venture Capital | Sam's Start Up | Technology | Software | First Round Funding | |

SYSTEM AND METHOD FOR GENERATING TRANSACTION BASED RECOMMENDATIONS

CROSS-REFERENCE TO RELATED APPLICATIONS

This application claims priority to provisional application Ser. No. 60/441,756, which was filed on Jan. 23, 2003 and which is incorporated herein by reference.

BACKGROUND OF THE INVENTION

1. Field of the Invention

The present invention is directed systems and methods for tracking and managing historical investor and investor action data. More particularly, the present invention relates to systems of methods for analyzing the historical performance of investors and investor actions, and for using the analysis to generate recommendations for future action in accordance with preferences and objectives.

2. Description of the Related Art

For years, art reigned over science in the investment arena, as it still does in many firms. In the past several decades, however, more scientific approaches have emerged which generally use more modern technology to employ mathematical techniques. Institutions spend $50 billion each year on investment managers and research. Much of that is spent gathering corporate, industry and national economic data and then modelling that information to make recommendations to investors.

Nonetheless, this development has failed to create greater market efficiency and advisor agreement; instead, it has merely multiplied the number of different techniques and consequent opinions. One of the major drawbacks of these systems is that they require the average investor to select among a variety of usually complicated mathematical approaches. Another drawback of these systems is that their usefulness will vary over time as the market weighs the various economic factors differently. (For example, the decreased focus on "price-to-earnings" or "PE" ratios during the rapid climb of Internet stock prices.)

At the same time, more people have made investments in the stock market today than ever before. And more of those people are directly involved in managing their investments, merely consulting or altogether bypassing traditional brokers to make their own decisions and execute trades via online services and other "direct" brokerage services. Similarly, gaming or gambling sites, such as those facilitating the placing of bets on sports contests, are experiencing increased popularity. These trends have been accelerated by increases in these services, decrease in the price for these services, availability of necessary technology (such as Internet access) and investor familiarity with the market. Even more so, the trend associated with the stock market will be accelerated by the number of investment firm scandals, since another drawback of both traditional and more modern advice systems is that what brokers recommend to an investor and what they do for their own investments is not always the same thing.

While some inventions claim to assess total portfolio holdings and may have a partial benefit of looking at actions rather than mere recommendations, they have several other disadvantages eliminated by the present invention. Such disadvantages include limited numbers of investors for analysis, limited numbers of objects involved, and—in the case of the fund manager approach—a lack of sensitivity to the shifts in stock price caused by such institutional moves. An additional disadvantage avoided by the present invention is a portfolio-based approach for evaluation rather than a transaction-based approach, since the portfolio-based approach requires the subscriber to match an overall series of positions rather than evaluating single transactions. Still another disadvantage avoided by the present invention is a lack of sensitivity to changes over time provided by their backward-looking approach, since an equity held in a "model" portfolio may have increased in price since acquisition. Other disadvantages of these inventions, such as their lack of a mechanism for assessing what is defined here as user "confidence," become increasingly apparent through the detailed description below.

Still other inventions claim to perform analysis of recommendations of a limited number of industry or media "experts." In addition to the earlier stated disadvantage of being based simply on recommendations rather than transactions, such inventions have several other disadvantages eliminated by the present invention. Such disadvantages include absence of the millions of individual investors, absence of an aggregate transactional weighting factor for assessment (termed evaluation "conviction" in the present invention), limitation to pre-defined periods of time rather than continuous periods of time, limited numbers of objects involved in recommendations and vulnerability to external influences such as media coverage.

As a result, there remains a need for a system that is easier for the investor to understand and use and that is less vulnerable to the evolution of the market or the suspect motives of investment advisors.

SUMMARY OF THE INVENTION

The present invention includes a system and method for capturing, storing, and analyzing investor characteristics and actions on objects ("objects" is used to refer to equities, commodities, currencies, aggregate funds and other traditional vehicles or transactions associated with investing in addition to less traditional vehicles such as gambling transactions) and assessing the performance of those actions on an absolute basis or relatively. Transaction data, individual investor and subscriber characteristics and actions can be loaded into a database at the outset and updated over time. These records may be obtained from and maintained via brokers (for example, online discount brokerage services or online gaming sites) and also directly from subscribing individuals. Historical data and/or real-time data may be used. Modeling techniques may be used to assess and evaluate the data in order to generate recommendation data.

One process can be provided to apply principles for assessment to the investor data, initiated by changes in the data or changes in the principles or requests from subscribers. A second process can then evaluate the assessment output by applying principles for evaluation, thereby estimating the effectiveness of various courses of action in conjunction with subscriber characteristics and subscriber objectives. The system can then deliver recommendation data to the subscriber while recording its assessment and evaluation in the database and providing feedback to the rules base. Recommendation data may include an associated level of certainty that is a function of variables such as the number of investors on whom the evaluation is based and the degree of confidence and competence evidenced by each of those investors.

One advantage of the present invention is that it eliminates investor confusion over competing theories and mathematical systems, by focusing on action and keeping hypotheses or even recommendations "behind the scenes." By doing so, the invention has another advantage of eliminating investor vulnerability to gaps that may arise between recommendations made and actions taken. Further, by focusing on individual actions, another advantage of this invention is to automatically take into account developing trends in the stock market that may not be perceived by or responded to by some of the strictly mathematical approaches. One other advantage of focusing on user-level information—personal and transactional—as the basis of this system is that the tremendous number of investors involved provides an opportunity to achieve greater statistical significance to any observations, which translates to less volatility in estimates and therefore less vulnerability to the investor.

Another advantage of the invention is that it enables outputs more sophisticated than simple "buy" or "sell" recommendations by using a continuum for each of the two key variables associated with a transaction evaluation: the extent (quality and quantity) of the data available for evaluation and the confidence demonstrated by the investors comprising that data. (Of course, these two variables may be combined for simplified communication, but even in such instances there will be a greater spectrum of outputs available to the subscriber.) According to an embodiment of the present invention, a system for generating recommendation data is provided. The system includes an assessment unit and an evaluation unit. The assessment unit is configured to receive transaction data for a plurality of transactions. The transaction data includes transaction and object characteristic data, such as the name of the object, size of the transaction, time of transaction and entity making the transaction, for each transaction. The assessment unit assesses each transaction and generates assessment data based thereon. The evaluation unit is coupled with the assessment unit and configured to receive a proposed transaction and generate recommendation data in response thereto. The recommendation data includes a certainty indicator which indicates a level of confidence that the proposed transaction will meet preset criteria. The recommendation data is based on said assessment data.

According to another embodiment of the present invention, a securities trading system is provided that includes a trading platform, a transaction data facility, and at least one user interface. The trading platform is coupled with at least one electronic securities exchange and configured to generate and execute trade orders within the exchange. The transaction data facility is coupled with the trading platform and configured to capture transaction data related to trade orders generated and executed by the trading platform, to store, maintain and to analyze the transaction data. The transaction facility includes an assessment unit configured to assess each order and generate assessment data based on the transaction data. The transaction facility also includes an evaluation unit coupled with the assessment unit and configured to receive an evaluation request. The request includes at least a proposed trade order. The evaluation unit is configured to generate recommendation data in response to the evaluation request based on assessment data generated from transaction data for execute trade orders for a same object as an object of the proposed trade order. The user interface is coupled with the trading platform and the transaction data facility and configured to request trade orders to be executed by the trade platform, to request an evaluation from said transaction data facility, and to receive and display the recommendation data generated by the transaction data facility.

According to another embodiment of the present invention, a method is provided for generating a recommendation. The method includes a step for receiving transaction data relating to a plurality of transactions. The transaction data includes the name of the object of the transaction, the object price, the size of the transaction, and the entity requesting the transaction. A proposed transaction is received including proposed object name, object price, transaction size, and order source. It is determined which transactions of the transaction data are relevant to the proposed transaction based on the transaction data and the proposed transaction data. A recommendation is generated relating to the proposed transaction based on the transaction data of the transactions determined to be relevant.

Consequently, the invention provides a variety of possible ways in which it may be introduced to the marketplace, including such examples as: a product for online institutions to integrate into their offerings or resell it to customers, a data collection and analysis service for institutions, an independent service available directly to consumers or the strategic core of a proprietary mutual fund.

BRIEF DESCRIPTION OF THE DRAWINGS

Further applications and advantages of various embodiments of the present invention are discussed below with reference to the following drawing figures:

FIG. 2 illustrates an example of a database for storing information on individuals whose transactions are made available to the system;

FIG. 3 illustrates an example of a database for storing information on transactions;

FIG. 4 illustrates an exemplary page of an interface (such as on a personal computer or personal digital assistant) by which the subscriber can request actions from the system or link to other system functions;

FIGS. 6A-6B are a flow chart of an exemplary process for assessing transactions and corresponding rules which may be implemented;

FIG. 7 illustrates an example of a database for storing the information retrieved and/or calculated by the assessment process;

FIGS. 9A-9B are a flow chart of an exemplary process for aggregating assessments and corresponding rules which may be implemented;

FIG. 10 illustrates an example of a database for storing the information retrieved and/or calculated by the evaluation process;

FIG. 11 illustrates an example of data records in a database for storing records related to the communication between the subscriber and the system;

FIGS. 12-13 illustrate an example of pages of an interface (such as on a personal computer or personal digital assistant) by which the subscriber can receive evaluations from the system or link to other system functions; and FIG. 14 illustrates exemplary data records of object characteristic data.

DETAILED DESCRIPTION OF THE PREFERRED EMBODIMENTS

Figure 1A:
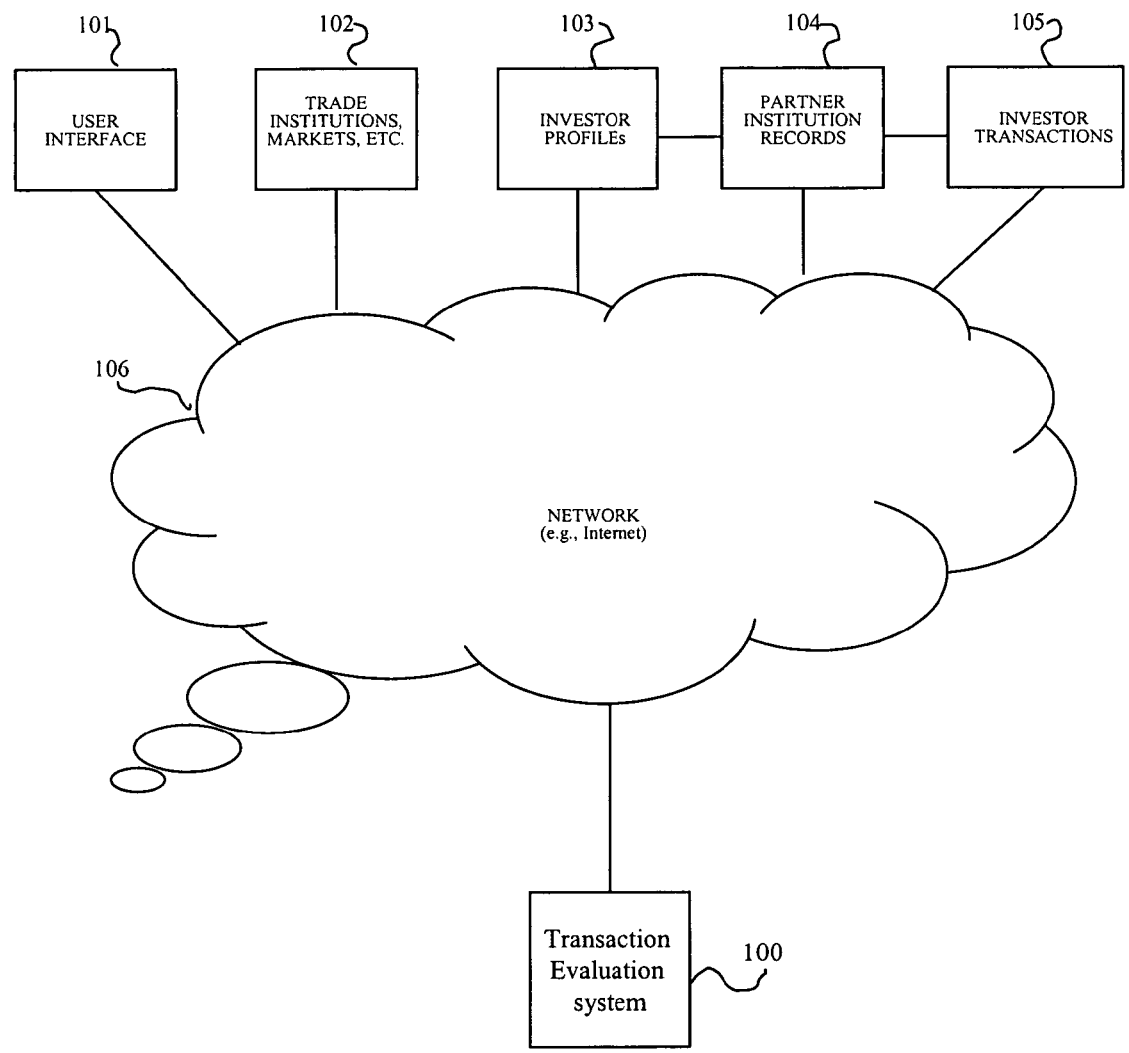
FIGS. 1A-1B are block diagrams of an transaction evaluation architecture that receives information and requests via private and/or public networks (such as the Internet), evaluates the information and returns its findings to subscribers through similar channels.

The following terms are meant to be used throughout this specification with their respective following definitions:

User—used to describe an entity that makes a transaction, which is evaluated by the system. In one embodiment, users are typically individual traders or entities uniquely identified with distinct investment styles and goals and with a distinct record of transactions that may be assessed by the present invention. A user may have more than one account through which transactions can be executed, in which case processes described below may be executed for single accounts and/or across multiple accounts.

Subscriber—used here to describe a user authorized to make requests of or receive evaluation or recommendation information from the present invention. All subscribers are presumed in the preferred embodiment also to be users, such that a subscriber's past transaction history is one of the inputs for transaction evaluation. It is possible, however, in certain embodiments of the invention for subscribers not to have records as users (e.g., the invention is set up as a stand alone system and the subscriber's transactions are not linked to the system), in which case the invention still functions on the basis of the other data available. Furthermore, it is recognized that embodiments of the present invention could be implemented with a non-subscriber based system and therefore, the use of the term is meant to be illustrative and not limiting.

Confidence—an indicator used here to describe the invention's assessment of a user's relative aggressiveness, typically associated with a user transaction.

Conviction—an indicator used here to describe the invention's aggregate assessment of one or more users' relative aggressiveness associated with one or more transactions.

Competence—an indicator used here to describe the invention's assessment of a user's relative demonstrated ability, typically associated with a user transaction but at times then aggregated for the user overall (in which case it is termed "user competence").

Expertise—an indicator used here to describe the invention's aggregate assessment of one or more users' relative demonstrated ability associated with one or more transactions.

Assessment—used here to describe the invention's process for analyzing a single transaction by a single user (e.g., generating confidence and/or competence scores).

Evaluation—used here to describe the invention's process for aggregating transaction assessments across users' transactions in order to generate recommendations.

Certainty—intended to be an indicator of the relative worthiness of a proposed transaction relative to a subscriber's or requester's stated financial goals and objectives. Ideally, certainty indicates the probability that a proposed transaction would successfully meet the subscriber's or requester's stated financial goals and objectives. As used in the examples, certainty is the overall "score" of the evaluation in such instances that the system combines the conviction and expertise assessments into a single overall rating for the transaction.

Transaction—used here to describe both actual and hypothetical actions involving objects (e.g., business transactions, financial transaction, real estate transaction, etc.), where such actions encompass the variety of actions made available to users (such as shorts, buys and sells in the case of an investor) as well as inactions that may be inferred by the system (such as holding a stock in the case of an investor). Further note that transactions may be informed to varying degrees, so that holding a stock after receiving from the invention an evaluation of a sell transaction may be distinguished from holding a stock in the absence of receiving such an evaluation.

Object—used here to refer to the core subject matter of a transaction, for example, the equity being traded or an event on which a bet is placed. Objects may be grouped by like characteristics for the purposes of analysis and evaluation (e.g., the industry of a particular equity or the type of sport on which a bet is made). Limitless characteristics of the object may be used to group and associate objects and related transactions. Thus, a skilled artisan will understand that use of different characteristics as examples in this patent specification is not meant to be limiting. For example, an object could have multiple industries associated with it (e.g., IBM—high tech, computer hardware, consulting services, etc.). By the same token, one type of object may have a completely different set of characteristics associated with it than another type of object. The embodiments of the present invention have been described herein primarily with reference to financial investment examples, and therefore object characteristics used for describing assessments and evaluations herein are merely illustrative. For example, the term "industry" is used repeatedly below, however, the present invention is not limited to objects of which a characteristic is "industry" and the use of particular object characteristics is not required.

According to the present invention, reliable financial investment recommendations are provided based on an assessment and evaluation of transaction data from a variety of data sources. In one embodiment, a subscriber based system provides financial investment data to its subscribers via an electronic data network. Subscribers, through a user interface, preferably graphical (GUI), can request recommendations regarding various equities or other financial instruments which the subscriber is interesting in purchasing, selling, purchasing related options therefore, etc. The system generates the recommendation data by collecting and evaluating data from any number of conventional sources, such as online brokerages, markets, ECN's, etc., and from its own subscribers.

The invention as set forth can be a stand alone system into which subscribers enter their requests, may be deployed as one "layer" of processing in the context of a transactional system (for example, by an online broker), or may be set up as something of a hybrid (for example, linked to receive data from the online broker but presented to the subscriber as a stand alone system). Further, the invention may be deployed in conjunction with other automated systems which collect economic performance data on companies, industries or nations to create additional inputs. Of course, the invention may also be implemented with an automated investment system which may be authorized to take various actions automatically, for example to act on all evaluations above a given certainty level. In another application, the invention could be implemented (alongside other inventions) to compare the actions of an investment firm's or investment advisor's clients to the actions of that firm or advisor as a regulatory check.

One novel feature of the present invention is the utilization of transactional data for the generation of recommendation information. Transactional data may be taken directly from market sources, from subscribers within the present system, or purchased from third party data providers. Transactional data may be stored and, accordingly, each transaction serves to expand a growing historical database which may be analyzed and modeled to generate reliable recommendations.

Real-time price and sales volume information on various objects can be received and related information may be stored at appropriate intervals (e.g., daily, hourly or at the time of a subscriber request for evaluation). Automatic evaluation of closing transactions (for example, a "sell" transaction on all objects currently held) can be provided, and those evaluations can be displayed alongside current portfolio positions in order to increase subscriber awareness of investment opportunities. Similarly, real-time gaming odds and betting volume information may be captured and stored.

As will be explained in further detail below, transaction data is evaluated in context—along with other factors such as market conditions, size of the transaction, number of similar transactions performed by others, experience of the trading entity exercising the transaction, resulting gains or losses, gambling odds, weather conditions related to a game, and other characteristics—to generate recommendation data.

In the most basic sense, the present invention looks at any transaction as providing valuable information, and also looks at who made the transaction, under what conditions it was made, and what the results of the transaction were. For example, if a particular user purchases a large number of shares of IBM, and that same user has been historically successful at purchasing related industry stocks (e.g., large capitalization technology stocks that have been issued for more than 50 years), this transaction taken in this context is data in favor of purchasing IBM at a certain price and time. When a recommendation regarding IBM is requested, this transaction data can be used along with other relevant data to provide a reliable recommendation. For example, the size and recency of this particular transaction could be used to weight the effect of the transaction data on the overall recommendation.

Similarly, even more may be learned from unsuccessful users. For example, transactions made by a chronically poor trader of IBM stock could be used as well (e.g., purchases may indicate that the stock should be sold, or sells could indicate that the stock should be held or purchased). Ideally, transaction data regarding a high number of transactions is assessed and combined to formulate a more reliable recommendation. Recommendations may be based on transactional data from any trading entity, including, but not limited to, users of the present invention. Moreover, transaction data may be combined with any number of conventional recommendation sources, such as publications and services, to formulate a more well-rounded individual recommendation. In such a case, the invention's ability to assess transactions with consideration for the relationship of different users becomes even more valuable. For example, it would identify an instance where a generally effective gambler on college football has an occasional weakness for following the advice of one particular gaming "hot tip" service and then break out for separate consideration those cases where the user's bets agreed with the service.

FIG. 1 is a block diagram of an exemplary transaction evaluation system. Transaction evaluation system 100 is configured to collect personal and transactional information in a variety of ways such as via a network 106 (such as the Internet) or offline in lump sums or via batch processing, maintain and analyze the information, and generate financial recommendation information. System 100 is configured to communicate with one or more user interfaces 101, to provide access to system data and functions. System 100 may be implemented using a variety of networks (e.g., a proprietary wide area network) and with a variety of networking devices, but will be described here in the context of the Internet as one network enabling implementation.

System 100 is configured to receive personal and transactional information from a variety of sources both reactively (such as in response to subscriber evaluation requests or when a user conducts a transaction) and proactively (such as when conducting periodic or updates). System 100 may regularly receive (at predetermined intervals, for example daily or hourly) transaction data or be given real time access to and storage of user transaction information. Such information might include both elements or characteristics of the transaction (such as transaction type, object involved, unit price at time of transaction, total units, total price, time and date of transaction, etc.) and a "snapshot" of the investor's position at the time of transaction (such as total assets, cash available, key profile elements).

Exemplary sources of data may include direct input from a user 101, publicly available information (such as stock price, trading volumes or specific object information) from trade institutions, markets, trading platforms, alternative trading services such as ECN's, etc. (collectively 102) and third parties 104 (such as online brokers with whom partnerships have been arranged or third party data providers), who may have historical information relating to individuals 103 and financial transactions 105. In a gaming type implementation, information can be received from online books, horse tracks, sporting news websites, as well as from a variety of other online services.

System 100 may be configured to store both gathered and calculated profile information such as investment styles and objectives of users who may participate in a system linked to, provided by or supported by the present invention and use this historical record to analyze characteristics associated with success and/or to compare profiles for similarity. System 100 may use current object information to assess each user's success. System 100 may further search and collect all relevant transactions and user profile information for any transaction evaluation when prompted to do so by a subscriber request or ongoing system update requests.

System 100 can be configured to automatically assess for each transaction captured, the level of investor "competence" to recognize the different levels of expertise that exist among investors and that may exist within the same investor across different investment areas or transaction types. System 100 may also be configured to automatically assess for each transaction the level of investor "confidence" in order to recognize the different levels of aggressiveness that exist among investors and that may exist within the same investor across different investment areas or transaction types.

Transaction data should be captured including information such as object name, order size, time, and price, order type, etc. For simplification, information referenced as "transactional data" is meant to include characteristics and information about the transaction and characteristics and information about the object of the transaction. For example, transaction data in a gaming implementation could include information about the bet, the type of bet (exacta, trifecta, etc.), odds, etc. and about the event underlying the bet (horse race, football game), and any other information relevant to the transaction, e.g., a football team's record in December, the weather, etc.

System 100 may also assess transaction entity actions for recency and relevancy relative to the point at which the evaluation is made (e.g., a proposed trade order), according to when prices may have changed and other information is likely to be available in the market. The object information, transaction information, user profile information, competence assessment, confidence assessment, recency assessment and relevancy assessment can be combined into an aggregate rating—a single overall evaluation of a proposed investment transaction can be provided to a requester.

System 100 can create a rating that is specific to a user's recorded investment style and objectives. Accordingly, a user profile can be created for each subscriber to capture and update such information.

System 100 can also create a user profile for non-subscribers by analyzing transactions therefore, to determine any patterns of behavior that would indicate the user's style and objectives.

Any portion of or all of the above information used during assessment and evaluation could be directly presented to subscribers who desire more information or control over the process. Preferably, several options are provided to the subscriber for sorting and viewing several evaluations at the same time in order to compare different transactions. For example, the subscriber may request evaluations for all transaction types on a single object, or may request "buy" transactions for all objects in a certain industry with a certain market capitalization. Similarly, the subscriber may request a list of evaluations with expertise and/or conviction above or below specified levels.

Transactions exist in a variety of forms such as trade orders—shorts, buys, sells, holds, puts, calls, informed "no action," etc. These different transaction types can be assessed individually and/or can be integrated as relationships between them are determined by the system. That is, system 100 can be configured to determine how a decision by one investor to sell a stock at $10 is integrated with a decision by another investor to buy that stock at the same price at the same time, adjusting for their differing objectives and the seller's original purchase price. Similarly, system 100 could determine the relationship between a short transaction and a buy transaction holding all other factors such as object, price and time constant.

System 100 may be configured to perform additional supplementary calculations among individual transactions as a function of aggregating the transaction evaluation. For example, the assessment engine may determine based on historical information that whenever Investor A and Investor B take a similar course of action, the probability of such a course of action being successful is substantially greater than when only one of the two investors takes an action. When data is limited, such interactions are likely to merely be summed as a linear increase in probability (e.g., if each is wrong 30% of the time, then an instance where the two agree is likely to be wrong only 9% of the time). As data grows, the possibility increases for the system to evaluate such instances separately to look for non-linear outcomes (e.g., an instance where the two agree is likely to be wrong only 5% of the time) and to adjust the evaluation accordingly. In this manner, the invention recognizes occasions when "the whole is not equal to the sum of its parts."

Accordingly, system 100 can include logic to model and analyze the data as described in this document. Alternatively, system 100 could be coupled with a stand alone statistical analysis tool that performs the "number crunching." Commercially available modeling tools and known techniques can be used to analyze the data. For example, SAS/STAT® and SPSS Regression Models® are two currently available tools that analyze multiple variable relationships. One skilled in the art will understand that many multivariate statistical tools and techniques may be used to implement the present invention.

Evaluations can be communicated to the subscriber in either an absolute manner via ratings and scores (for example, a transaction evaluation has a conviction rating of 0.8 and an expertise rating of 0.65, or an overall certainty of 0.7) and/or in a relative manner which takes into account the subscriber's stated investment preferences and goals (for example, a transaction is evaluated as substantially higher risk than the subscriber profile dictates). Note that in an alternative embodiment of the invention, transactions might be evaluated in a relative manner using past subscriber transactions in addition to or instead of stated preferences (for example, a transaction is evaluated as lower risk than 70% of the transactions completed by the subscriber over the past year).

The underlying transaction data and associated evaluations may be made available to the subscriber in varying degrees of detail, so in this manner it is flexible according to the subscriber's desire for information and/or desire to develop investing strategies of their own independent from the system algorithms. At the extreme, subscribers could be given the ability to search and track individual user transaction activity and to see many of the composite elements of the algorithms in action: competence ratings, transaction conviction ratings, and so forth. Related to this would be the ability to see rankings of users, adjusted for specific periods of time, industries, transaction types or other criteria.

In another embodiment of the invention, transaction costs can be directly entered into the system or received from linked systems in order to adjust evaluations accordingly. Similarly, tax implications from capital gains and losses could be made available and then incorporated into evaluations. In both cases, system 100 could simply adjust evaluations to highlight such contingencies to the subscriber (e.g., the certainty of a sell transaction on Object 1 is 0.8 if you are taxed at the lowest rate but 0.75 if you are taxed at the highest rate).

System 100 could be configured to include functionality that maintains various "top ten" or "hot tip" lists for display to the subscriber without a subscriber prompted request for evaluation. Such lists might be calculated based on conviction, expertise or overall certainty, or other indicators, and then grouped into various categories of interest to the subscriber such as different transaction types or different industry areas. Similarly, in the case of financial transactions, such a list might highlight individual investors based on their overall performance or performance for a defined recent period. Note also that because the system maintains a record of its own evaluations, lists might be compiled for evaluations that have changed dramatically during a recent period.

System 100 could be configured to provide evaluations (reactively to subscriber requests or proactively to predetermined time or environment criteria) of broader sets of transactions in order to offer a more "macro" view of the marketplace to the subscriber and thereby guide subsequent subscriber requests for transaction evaluations. For example, an evaluation might be performed for all "buy" transactions for a market segment (e.g., by industry area or company capitalization). Alternatively, a more "bottoms up" approach might be employed by which the system identifies stocks or industries that are being actively traded by leading traders.

Information on which subscribers received what advice may be captured and stored. In this manner, the system can begin to separate inaction that is presumed to be uninformed from inaction that is presumed to be informed, thereby, for example, associating an informed action to "not buy" closely with an informed action to "hold." This is another advantage of linking evaluation data with user action data—it is mutually reinforcing in that it enables awareness (or, in some cases, reasonably confident assumptions) of what informed the action, therefore creating new classes of data and—more importantly—minimizing spiraling feedback loops that fail to distinguish high transaction volumes from herd mentality sprees. That is, the actions of users who make a transaction subsequent to receiving a related evaluation from the system may be distinguished from and accounted for differently from the actions of users who make a similar transaction without receiving a related evaluation from the system.

Data is maintained describing which past transaction by which users were consulted by the system in evaluating a potential transaction or recommendation request. This affords the invention the ability to reward subscribers and/or users with "advisory credits" for making their data available, thereby providing a unique marketing value proposition to users and subscribers and/or providing a mechanism to encourage users and subscribers to make their data available in the event future regulations remove ownership of the data from current sources, such as online brokerages or other current "second party" or "third party" owners from whom the data may be obtained currently.

System 100 may include a randomizing algorithm, which selects which investor actions to use to evaluate a transaction when more data than is required exists to reach the necessary level of confidence. (Note that the algorithm may be used to similar effect when evaluating competence of individual users.) This affords the invention three additional advantages. First, it speeds up transaction calculations by lessening the number of past transactions required for assessment. Second, it permits a limitation on the number of "advisory credits" required to be paid out when such a feature is in use. Third, it further reduces system vulnerability to coordinated efforts at outside influence, assuming users were aware of the presence of the invention and attempted to use it to conduct a conspiracy similar to the "pump and dump" scandals.

System 100 may enable the search for coordinated investor movements. While the learning processes as set forth will automatically adjust for such occasions by considering investor interactions (e.g., investor A buys stock 1 and investor B buys stock 1 are evaluated distinct from the event of both investor A and investor B buying stock 1), such occasions may be reported separately for audit or even regulatory purposes (e.g., if investor A and/or investor B are considered corporate "insiders" according to the terms set forth by the Securities Exchange Commission).

Figure 1B:
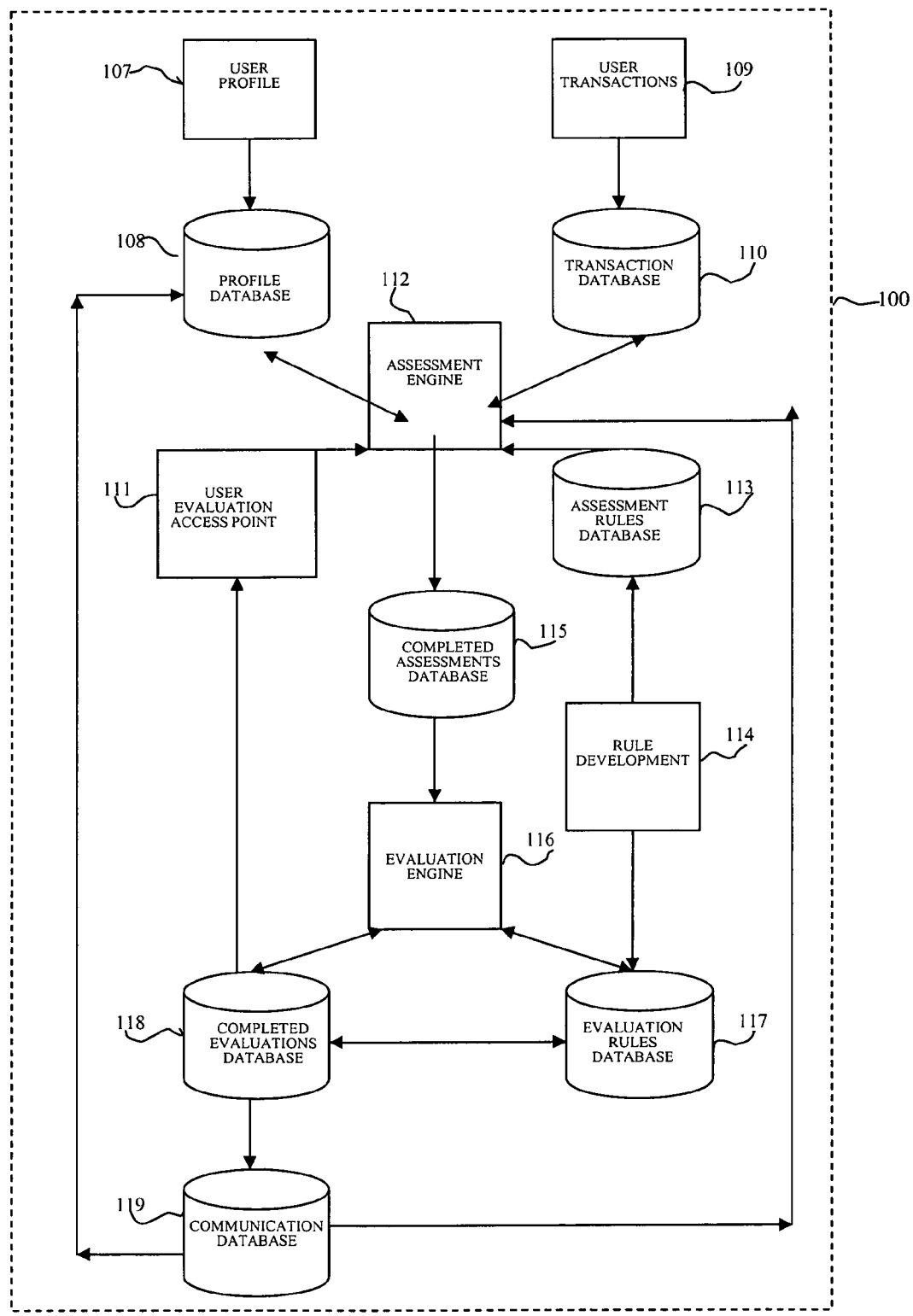

Referring to FIG. 1B, a detailed block diagram of system 100 is shown according to one embodiment of the present invention. System 100 may include a number of subsystems that may be implemented via conventional hardware or software. For example, system 100 may include a user profile subsystem 107, user transaction subsystem 109, each of which may have individual databases 108 and 110, respectively. An assessment engine 112 and evaluation engine 116 may receive information from a number of data sources, internal and/or external to system 100. In this embodiment, an assessment rules database 113 and evaluation rules database 117 are implemented to store the rules and algorithms for performing assessments and evaluations.

User profile subsystem 107 may be configured to store and maintain subscriber preferences such as trading style, aggressiveness, etc. User profile subsystem 107 may also implement user and system security, and therefore, security profiles may be maintained and stored as well.

User transaction subsystem 109 may be configured to capture transaction data as trade orders, bets, etc. are made and executed. Further, as described above, transaction data may be directly entered, received from external systems in real-time or via batch processing. User transaction subsystem stores sufficient transaction data for reliable assessments and evaluations, as is described in more detail below.

All individuals who have transaction data stored in the system or who have subscribed to use the system can be assigned a unique record of personal information 107 stored in a user profile database 108. Further, as individuals may have more than one investment account and those accounts may be managed according to varying objectives, a preferred embodiment of the system maintains distinct user profile records for the different accounts while maintaining the ability to "link" data across accounts based on a common user ID. These user profile records may be compiled through a variety of means such as direct user entry or the administration of different tests (such as investment proficiency) to the user. In addition, at different points in the investment evaluation process the user profile records may be updated with information discovered or calculated by the system.

Assessment engine 112 and evaluation engine 116 are configured to perform the assessment and evaluation processes according to the present invention. As mentioned above, statistical analysis tools may be used to model the system data, and therefore, could be included in or coupled with the assessment engine 112 and evaluation engine 116. Further, there may be a rules development subsystem 114 for creating and maintaining the assessment and evaluation rules.

One skilled in the art will understand that the features and functions of the present invention may be implemented using a variety of conventional hardware and software in conjunction with many known programming techniques. For example, the present invention may be implemented with distributed system architectures or centralized architectures. Accordingly, the specification examples and configurations herein are not meant to limit the present invention.

FIG. 2 shows exemplary records of an exemplary user profile database 108. Although other data may be stored and the data may be arranged in a variety of ways, the process will be described here using this arrangement of a more limited data set for purposes of simplifying illustration. Examples of user profile information that might be of use to the process include record identification elements (such as user ID, account ID and similar information for the user and account at a partner institution if the information is made available via a third party), security information (such as a subscriber password), other financial information (such as credit bureau data retrieved by user permission), stated demographic information, contact information, stated investment guidelines (such as goals and acceptable risk levels), stated abilities (such as level of experience and areas of specialty), tested abilities (such as online investment or personality test results), calculated abilities (such as the results of previous transactions), tracked direct activities (such as the number of evaluation requests submitted) and tracked indirect activities (such as the number of times their transactions have been "consulted" to prepare evaluations for other subscribers).

Similarly, the transactions executed by these various users for their accounts 109 are stored in a user transaction database 110. As with the user profile records, these user transaction records may be compiled through a variety of means such as direct user entry en route to the transaction (if the system is integrated with a brokerage service such as an online broker), direct user entry after the transaction (if the system is implemented independent of any brokerage services), or indirect user entry after the transaction (if the system is linked with a brokerage service but not integrated into the transactional component). User transaction records may also be updated with information discovered or calculated by the system. For purposes of simplifying illustration here, the system is described here in the context of being linked with a brokerage service "on the back end", that is, not integrated into the transactional component of the brokerage service.

FIG. 3 illustrates exemplary records of an exemplary user transaction database 110. Although other data may be stored and the data may be arranged in a variety of ways, the process will be described here using this arrangement of a more limited data set for purposes of simplifying illustration. Examples of user transaction information that might be of use to the process include record identification elements (such as a unique transaction ID and information to link it to the user), action elements (such as the action taken, the time and date of the action, the object of the action, and the status of the object at the time of action), calculated transaction characteristics (such as the strength of the transaction as a function of the user assets available) and tracked transaction characteristics (such as whether the transaction remains open or has been closed, for example in the manner that a "sell" transaction could be said to close an earlier "buy" transaction or in the manner that the passing of an expiration date could be said to close a time-limited option for action).

FIG. 4 shows an exemplary user interface 101 to the system 100, presented to the subscriber for initiating activities by the system. Although other data may be presented and arranged in different ways and other options for action may be presented, the process will be described here using this presentation for purposes of simplifying illustration. A similar simplification is made with regard to assuming the mode of subscriber access to be a personal computer (which could be other devices such as a PDA or telephone). Yet another similar simplification is made here and throughout the process with regard to assuming the subscriber to be an individual human being, since the "subscriber" could be any entity requesting information and/or making transactions, such as an automated trading system set to solicit evaluations and act on those above determined values (in which case traditional graphic presentation of data may be wholly unnecessary).

In an interface 400, several basic options are presented to the subscriber to initiate action. Options might include access (such as entering user identification information and password), request (such as object, object type, industry, action and request submission), shortcut requests (such as top investors, top transactions), personal information requests (such as past requests, past transactions and current ratings) and links to other "outside" systems (such as links to online brokerage services).

In the case that a subscriber gains access and submits an evaluation request via interface 400, the assessment engine 112 initiates an evaluation. Although other actions may be submitted via interface 400, the evaluation request will suffice to illustrate the functionality of the present invention since other actions (such as shortcut requests and current ratings requests) will lead to a similar series of system events, while still others (such as historical information requests) will be handled via simple retrieval that may be supplemented with a similar series of system events (for example, to show a subscriber a list of all past requests with a calculation of how effective those transactions would have been if followed).

Figure 5:
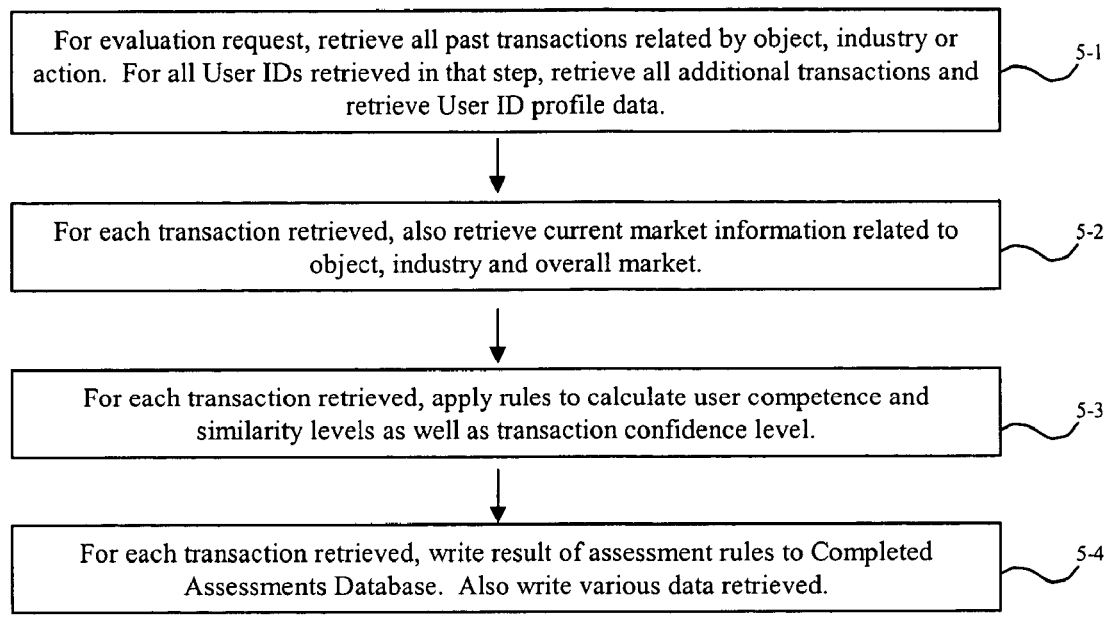
FIG. 5 is a flow chart of an exemplary process for assessing transactions (for qualities such as competence and confidence demonstrated) and individual investors.

FIG. 5 shows an exemplary assessment process. The assessment engine 112 may perform the assessment process through the application of assessment rules. In step 5-1, the appropriate records for assessment are selected (such as records from the user profile database and the user transaction database) and then the selected records are assessed. For each transaction retrieved, current market information related to the object, industry and overall market is also retrieved (step 5-2). For each transaction retrieved, user competence, similarity levels and transaction confidence levels are calculated (step 5-3). Once the transactions are retrieved and the various calculations are performed, the results can be displayed to the requester, further manipulated, and stored (step 5-4).

The example depicts a process that is largely linear such as that associated with the logic of traditional computer programming, which is one possible embodiment of the process and architecture of the engine. Other embodiments of these processes and architectures, such as non-linear processes that employ "fuzzy logic" and are implemented via non-linear architectures such as neural networks, would be evident to those trained in the art and are not only possible today but may be preferable. The linear process and architecture are used here for purposes of simplifying illustration.

Figure 6A:
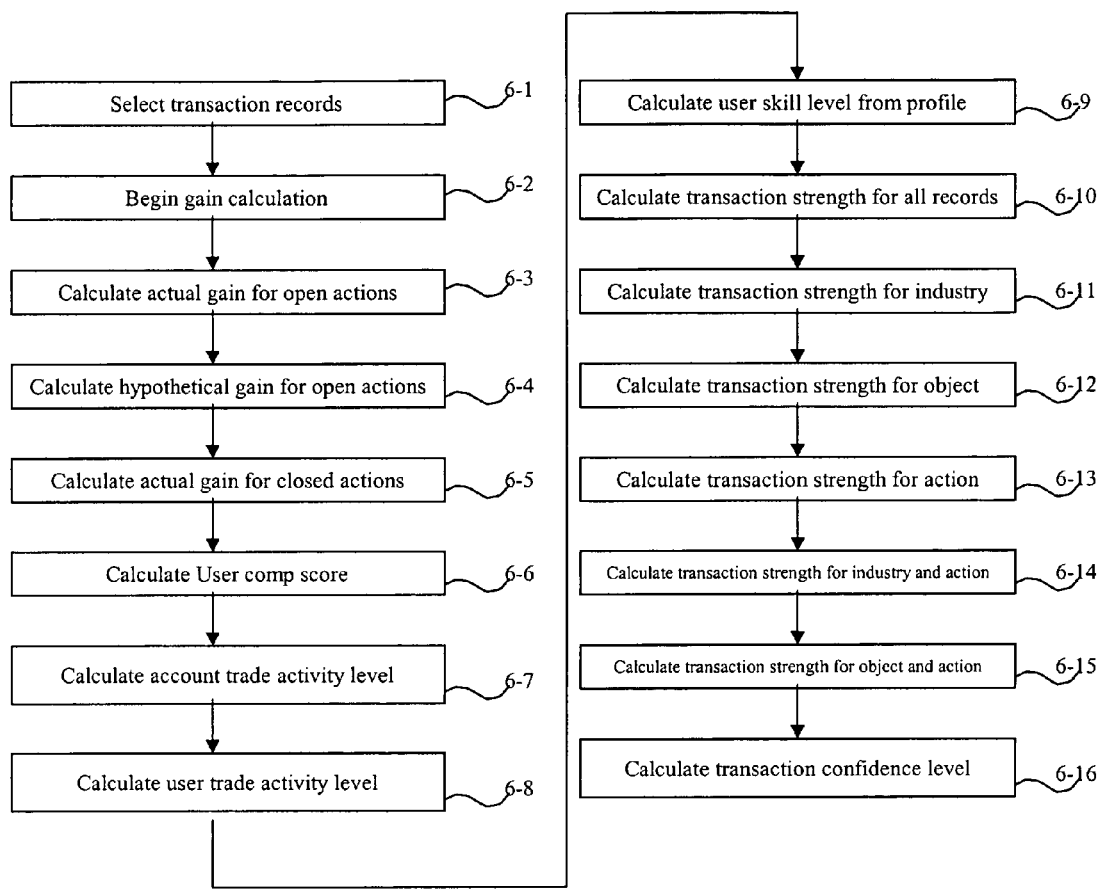

FIG. 6A is a flow chart of a detailed process for performing the calculations of the assessment process of FIG. 5, which may be defined in the assessment rules database 113. A limited data set is used for purposes of simplifying the illustration (in a manner that would be apparent to those skilled in the art, the number of variables read and calculated may be limitless, and rules in the database would be understood to increase exponentially from the number of variables).

Beginning at step 6-1, relevant records are selected. A search may be initiated for relevant investor transaction data. The relevance of investor transaction data may be binary (i.e., relevant or not) or may be a matter of degree, calculated based on variables. Relevance may be determined by application of user profile preferences and transaction criteria, such as user investment style and objectives, transaction type, object and object industry. For example, transaction data records may be selected limited by (1) same object or industry or transaction and (2) User ID not equal to User ID of evaluation request. Of course, this is just one possible example. It is just as likely that rules would be developed that would give previous transactions the User ID of the evaluation request more influence in the calculation rather than dismissing them.

At step 6-2, the actual gain or loss associated with the transaction is calculated. If the transaction is an "opening" transaction and is "closed" or "partially closed," the actual gain or loss is calculated on closed portion. Next, the competence is calculated as a percentage of dollars at stake in an "opening" transaction. That is, the competence of the transaction may be calculated as a ratio of the gain or loss divided by the original cost of the object. This figure may be annualized.

One skilled in the art should recognize that the net gain or net loss calculation may require consideration of variables other than buy and sell price, including elements such as rental income for real estate properties, dividend distributions for securities, etc. With more sophisticated vehicles as objects of the transactions and/or more complicated calculations, these additional variables may begin to play lesser or greater roles in meeting the stated objectives of the user and, consequently, may be considered differently in measuring the "success" of any transaction. For example, in the case of a real estate transaction, it is easy to envision an owner for whom capital gain on a property over time is of less interest than the rental income received. Thus, in some instances (whether requested to do so by the subscriber or guided by the system's analytical insight), the system might use one or more components of the net gain rather than the net gain itself.

It should be pointed out that competence is meant to reflect a user's relative ability. Therefore, the net gains or losses over a period of time for the user's entire portfolio, although important, may incomplete indication of a user's ability. Other approaches to assessing user ability might not weight the transactions according to the amount invested (e.g, might give equal weight to each transaction).

If the transaction is "open", a "hypothetical" gain can be calculated in step 6-3. If the transaction is "open" or "partially closed," the object status quo is found and the current hypothetical gain or loss is calculated on the open portion and then competence is calculated as a percentage of dollars at stake in "opening" transaction. This figure may also be annualized. With some objects, calculating hypothetical gains may be less intuitive, such as with bets on events that have not yet occurred. In most cases, there are still ways of achieving this (e.g., in the case of gaming, using some form of the changes in odds since the bet was placed), but when there are no conceivable methods the system still works as intended with the rest of the available data.

At step 6-4, the actual gain is calculated for "closing" transactions. The data for the corresponding opening transaction is selected, and the actual gain or loss is calculated on the closed portion. Next, the competence is calculated as a percentage of dollars at stake in "opening" transaction. This figure may also be annualized.

For each User ID and Acct ID with records selected, the above calculated competency scores are averaged and can be written to the User Profile Database for storage, at step 6-5.

At step 6-6, in this example, the account trade activity level may be calculated. All transaction data for the user may be found, and the mean and median duration of time than an object was held can be determined. For transactions that remain "open," the current date may be used as the end date. If the mean and median are both less than 10 days, "SHORT TERM" trading level is calculated for the user. If mean and median are both greater than 100 days, "LONG TERM" trading level is calculated. Otherwise the "AVERAGE TERM" trading level is calculated. Of course, the number of categories implemented is not limited.

If the user has more than one account, step 6-6 may be repeated for each account to calculate the user's overall trading level. If all trading level calculations are similar, that result may be used as the trading level for the transaction. If all are not similar, the mode is determined.

At step 6-8, the user's skill level is calculated. Optionally, tests, such as online test, may be given to supplement the data on a user's ability (similarly, scores of other online or offline tests not administered specifically for this purpose bust still of use might be collected, such as college entrance tests). This data may be combined with the above derived data. For example, if average test scores are greater than 80 and if the most recent comp score is greater than 15, then the skill level is determined to be an "EXPERT" skill level. If average test scores are less than 40 or if average test scores are greater than 60 and stated experience is "LOW" or if the most recent comp score is less than 0, the skill level is determined to be a "BEGINNER" skill level. Otherwise the skill level of the user is determined to be a "MODERATE" skill level. Of course, the number of different skill levels is not limited.

Note that investor competence may be considered to vary according to market activity. For example, a user who decides to buy a stock that is at an all-time low value may be making a better decision than one buying the stock when it is experiencing a "run" in its price (and vice versa). Accordingly, the algorithm used to assess investor competence may be modified to weight transactions in relation to market conditions as well.

The tests used to indicate a user's competence could be fed into a predictive analysis to determine whether the tests accurately indicate competence, and in fact, each question could be analyzed. Accordingly, the tests could be adjusted to increase reliability until ultimately, a test could be used to predict a user's success with certain types of transactions, for example, prior to the capture of sufficient transaction data to evaluate a user's competence.

At step 6-9, the transaction strength for each record is calculated. Preferably, each record is read, and the order of transaction strength values is ranked from low to high. If transaction strength for this user is in the lowest decile, calculate a value of 1, and so on to 10 to calculate overall user confidence.

At step 6-10 in this example, all records for transactions within a same industry for this user are selected, and the order of the transaction strength values are ranked from low to high (Of course, the association with other transactions might be effected with object characteristics instead of or in addition to industry, for example, in the instance of gaming transactions considering aspects such as what kind of sport is being played, whether it is professional or amateur, etc.). If the transaction strength for this a record is in lowest decile, calculate a value of 1, and so on to 10, to calculate user industry confidence.

At step 6-11, transaction strength is calculated for each object. All other transaction records, other than the current transaction, are selected for each object for each user, and are ranked in order of transaction strength values from low to high. If transaction strength for a transaction is in lowest decile, a value of 1 is calculated, and so on to 10 to calculate user object confidence.

At step 6-12, transaction strength is calculated for each action. All transaction records are selected having the same action (order type) for the user and ranked in order of transaction strength values from low to high. If transaction strength for a particular transaction is in lowest decile, calculate a value of 1, and so on to 10 to calculate overall user action confidence.

At step 6-13, transaction strength can be calculated for all other transactions with the same industry and action for this user and ranked in order of transaction strength values from low to high. If the transaction strength for a transaction is in the lowest decile, calculate a value of 1, and so on to 10 to calculate user industry action confidence.

At step 6-14, transaction strength may be calculated for each transaction, for object and action combinations. Each transaction is selected having the same object and action for the user and ranked in order of transaction strength values from low to high. If transaction strength for this transaction is in lowest decile, calculate a value of 1, and so on to 10 to calculate user equity action confidence. At step 6-15, the average of all resulting confidence values is used to calculate transaction confidence level, giving double weight to values for the same account for a user.

FIG. 6B shows examples of assessment rules components that might be employed to implement the flow process shown in FIG. 6B. The assessment rules data may include rule identification information (such as an ID number), a rule type designating its general assessment function (such as selection rule, competency rule, similarity rule and confidence rule), a description of the function of the rule (essentially a shorthand reference for analysts, statisticians and programmers), rule operation (such as comparison criteria and mathematical operations to be performed) and rule history (such as author of the rule and its date of introduction to the database).

The initial development and subsequent maintenance of assessment rules 114 may be achieved in a variety of ways and is largely determined in accordance with the process and architecture of the assessment engine. In the linear process and architecture embodiment chosen here for illustration, the rules may be developed by a team of analysts and statisticians working with large data sets "offline" to identify key variables and build models using currently available tools and techniques (such as, SAS/STAT® and SPSS Regression Models®). In such a case, the models would be revisited regularly (while holding evaluation processes constant) in order to refine the process for assessing transaction values. In alternative embodiments (such as the non-linear process and architecture referenced above), the assessment rules may be evaluated and revised continuously or "online" (prior to and/or after "live" implementation) based on feedback loops that provide information regarding how much value each rule adds to the assessment and/or evaluation processes. In yet another alternative embodiment, these "offline" and "online" approaches may be combined, such as using linear techniques to identify a broad set of possible key variables and then using non-linear techniques to adjust the "weight" each variable carries in the assessment.

In either case, the automation of the assessment process enables administrators of the present invention to supervise the generation of an almost limitless number of assessment rules and the trial application of those rules to historical data in order to gauge the value of each rule. Such "simulations" and consequent revisions can ensure that rules stay attuned to the changing dynamics of the marketplace. Alternatively, multiple versions of rules may be maintained for separate or "parallel" administration in order to "horse race" the benefits of different approaches. In such a case, two different sets of rules may exist in a situation where only one is applied in any instance (where the determination of which rule to apply might be written into the rule and determined by a "random" element such as whether the last digit of the user ID is odd or even). In another embodiment, these approaches may be combined, identifying a subset of the rules (such as one rule type) to be administered randomly while the rest of the rules are regularly revised in the manner described above.

Once a set of rules is in place and the assessment process has been initiated, the assessment engine references the assessment rules database in order to select the records according to the criteria established by the rules and performs the assessment process. In the example set forth here for illustration, the rules call for the selection of records (rule 01) from the user transaction database that have the same object, industry and/or transaction as the subscriber evaluation request but that are not transactions by the subscriber making the request. In such a manner, the engine will be able to assess what actions other users are taking with regard to this object and in the same industry, as well as with regard to what other objects other users are taking similar actions. In other words, in this example, it assesses what other users are doing with AAA stock, what other users are doing with other objects in the Finance industry (of which AAA is a part), and what other objects other users are buying.

The rules in this example then call for the calculation of a competence rating for each transaction (rules 002-005), which may be determined by categorizing transactions as "open" (for example, the purchase of a stock which has not yet been sold), "closed" (for example, the purchase of a stock which has been sold), or "partially closed" (for example, the purchase of a stock only some of which has been sold). In such an instance, the assessment engine will also retrieve current market information (such as object status and trading volumes). By calculating the gains or losses on the transaction (which is known for "closed" transactions and may be assumed based on present object value in the case of an "open" or "partially closed" transaction), an assessment of the competence (or success) of the transaction may be made. The rules then call for using the competence scores of the user transactions to calculate an updated overall competency score for the user in the user profile database (rule 005).

Next, this example calls for the determination of a level of similarity between the user associated with the transaction and the subscriber making the evaluation request (rules 006-008). In this manner, actions taken by users who have different investment goals or different levels of risk tolerance or different willingness to execute quick trades than the subscriber making the evaluation request may be discounted (or dismissed altogether) in the formulation of the evaluation. In the example set forth here for illustration, the rules call first for the selection of additional records from the user transaction database that have the same user as the transaction being assessed, then calling for the calculation of an average holding period or "trading level" (for example, to differentiate high-volume day traders from longer-term investors). This example also calls for the calculation of a skill level for the user associated with the transaction (rules 008), which may be used for matching to the skill level of the subscriber making the evaluation request and/or for variably "weighting" the transaction in the formulation of the evaluation.

As a side note, it is worth pointing out this approach to "trading level" as an example of the many instances in which the ends of the system may be effected in different ways. In a different embodiment, comparable functionality may be achieved by asking the subscriber at the time of the request to stipulate a period of time for evaluating the transaction (rather than assuming, as in the above example, that their profile answers hold sufficiently true for most transactions) and using that information to gauge transaction similarity. Further, it may be possible to ask users executing transactions how long they envision holding the transaction open, gaining yet another source of information for comparison.

The last stage in the assessment example is to calculate a confidence rating for the transaction (rules 009-015). In this manner, actions in which users put a significant amount of assets at stake (which may be assessed absolutely and/or as in this example relative to their total assets) may be weighted differently in the formulation of the evaluation than actions in which users are more conservative. In the example set forth here for illustration, this calculation again involves additional records from the user transaction database for the purposes of making a relative assessment of confidence, creating multiple contexts of increasing relevance for those assessments (such as whether previous transactions involve the same object, industry and action) and weighting the assessments accordingly. The assessment engine concludes its process once all of the steps have been executed and all retrieved and calculated data has been updated as needed to the completed assessments database 115.

FIG. 7 illustrates exemplary records of a completed assessments database, again using merely one possible arrangement of a limited data set for purposes of simplifying illustration. Given the function of the completed assessments database, its components will be determined by the outputs (retrieved or calculated) of the assessment engine, though this is of course in turn driven by the information determined to be of value to the evaluation engine. Thus it is reasonable to expect not only that a number of the components of the completed assessment database will be discovered during construction of the initial assessment and evaluation engine models but also that the list of these components will continue to grow and change as the models themselves evolve and call for corresponding changes in the rules and/or engines.

In the example set forth here, components of the completed assessments database might include transaction identification information (such as an ID number), associated user information retrieved and stored here for purposes of efficiency (such as user ID number, account number, transaction data and profile data), assessment engine calculations (such as user competence, transaction competence and transaction confidence), historical information (such as the time and date of the assessment and the set or "version" of assessment rules consulted) and utilization information (which may be updated by the evaluation process in the instance that the system tracks and grants "credits" for access to user transaction information).

Figure 8:
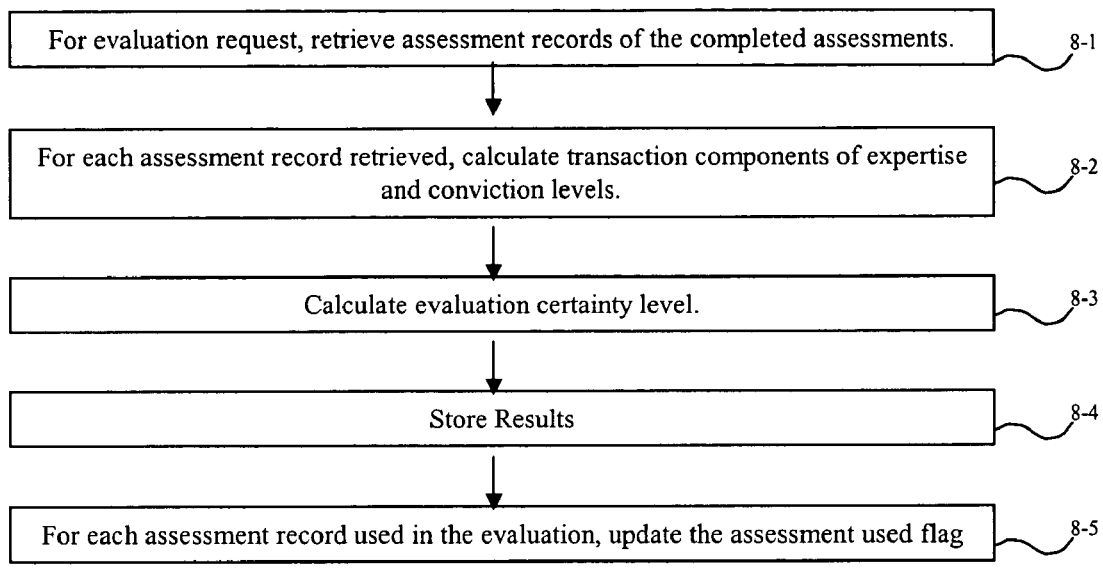
FIG. 8 is a flow chart of an exemplary process for evaluating assessment data.

FIG. 8 is a flow chart of an exemplary evaluation process for the evaluation engine 116 that is initiated once the completed assessments database is updated. Similar to the assessment engine, the primary function of the evaluation engine 116 is to perform the evaluation process, which is implemented in this embodiment through the application of the evaluation rules.

The evaluation engine 116 first selects the appropriate records for evaluation (such as records from the completed assessments database and the user profile database) and then evaluates the selected records (8-1). Next, for each assessment record retrieved, transaction components of expertise and conviction are calculated (8-2). Evaluation certainty can be calculated next (8-3). All the evaluation results may be stored (8-4) in the evaluation database, further manipulated or displayed to the user. The assessment records may be updated to indicate that they have been used in the evaluation process (8-5).

As in the example of the assessment engine, this example depicts a process that is largely linear such as that associated with the logic of traditional computer programming, which is one possible embodiment of the process and architecture of the engine. Other embodiments of these processes and architectures, such as non-linear processes that employ "fuzzy logic" and are implemented via non-linear architectures such as neural networks, would be evident to those trained in the art and are not only possible today but may be preferable. In the instance that the evaluation engine is comprised by a series of neural networks (which may be developed specifically for this purpose or based on one of several commercially available software packages), the neural nets are essentially "trained" in accordance with the invention using historical data. Also note that in yet another embodiment, the evaluation engine may share architecture with the assessment engine (in a manner evident to those trained in the art, they may even be one and the same). For purposes of simplifying illustration, the evaluation engine is depicted here as a linear process and architecture distinct from the assessment engine.

Figure 9A:
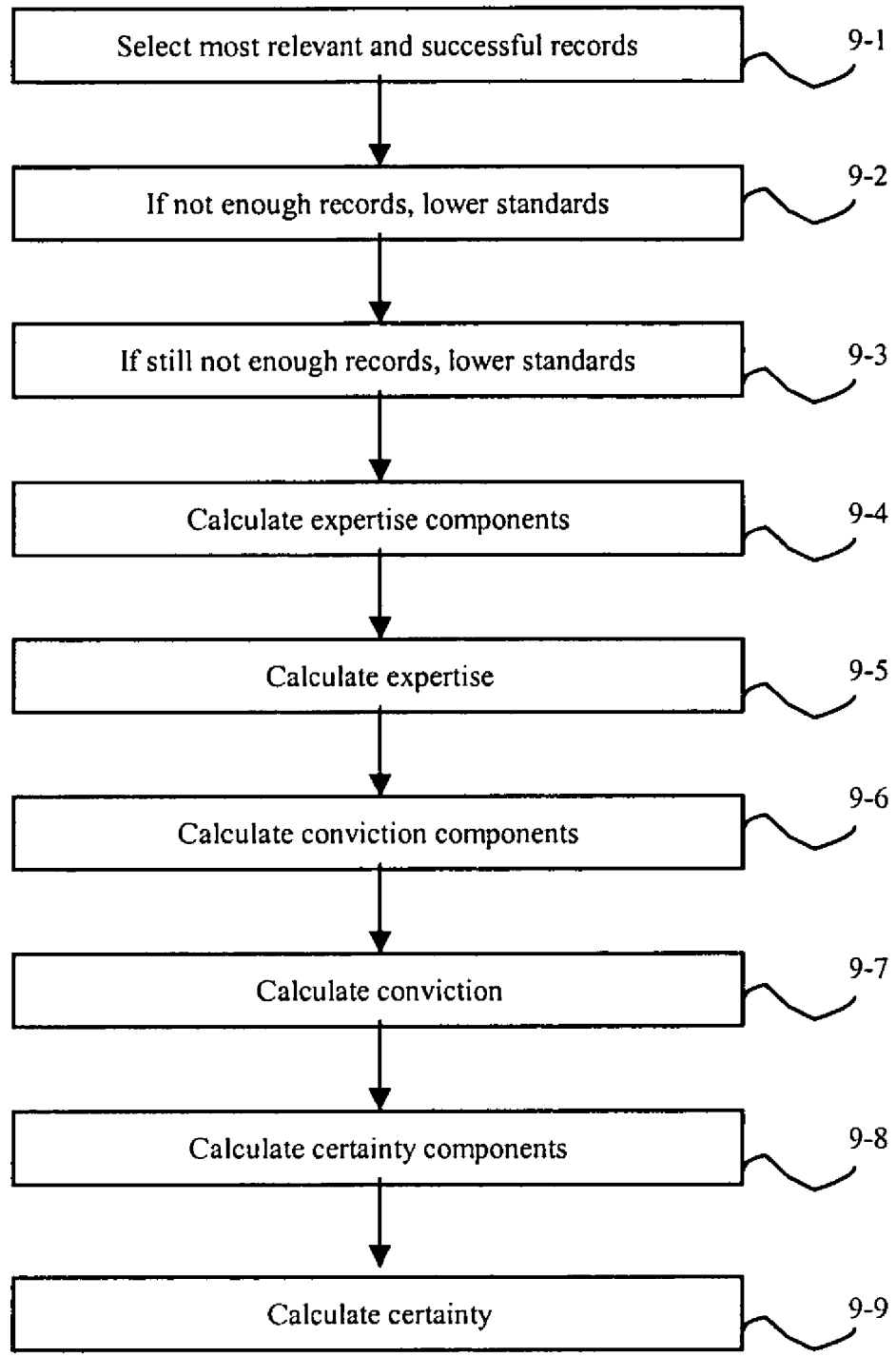

FIG. 9A is a flow chart of a detailed, exemplary evaluation process according to an embodiment of the present invention.

At step 9-1, the most relevant and successful records are selected relating to a request. All completed assessment records with (1) same object (if object specified in request) or same industry (if only industry specified in request) as evaluation request, (2) user competence is greater than 25 and confidence is greater than 7, (3) user goals from transaction are the same as user goals from the evaluation request, (4) transaction date is less than two years old, (5) action is same or opposite of evaluation request and (6) action is open. If number of records selected is greater than a preset limit, such as 1000 in this example, go to step 9-4, otherwise, go to step 9-2.

At step 9-2, additional records in Completed Assessments Database are selected with (1) same object (if object specified in request) or same industry (if only industry specified in request) as evaluation request, (2) user competence >10 and confidence >6, (3) action is same or opposite of evaluation request, and (4) action is open. If number of records selected are greater than a preset limit, such as 1000, or if evaluation is not for a specific object, processing continues at step 9-4. If the number of records selected is less than the limit and if evaluation is for object, go to step 9-3.

At step 9-3, steps 9-1 and/or 9-2 are repeated as needed, selecting records for the industry associated with the object, if object was specified.

At step 9-4, the expertise components are calculated. User competence value is added to the transaction competence rating to calculate the transaction component of the evaluation expertise rating, using a maximum value of 1000, then divided by 10. If the record was selected during step 9-3, the value is reduced by 50%. If transaction date is greater than 1 year old, the value is reduced by 10%.

At step 9-5, the expertise is selected by summing all values and dividing by the number of records to calculate the overall evaluation expertise rating.

At step 9-6, the conviction components are calculated. For each selected record in this example, values are assigned to the trade level according to Long=8, Medium=5 and Short=1. Of course, the number of trade levels and associated values is not meant to be limited. This value is added to the transaction confidence rating to calculate the transaction component of the evaluation conviction rating. If transaction date is less than 1 month from the current date, value is reduced by 10%. If action is opposite of evaluation request, the value is multiplied by −1.

At step 9-7, all values are summed and divided by the number of records to calculate the overall evaluation conviction rating.

At step 9-8, certainty components are calculated. For each selected record, the transaction component of the evaluation expertise rating is multiplied by the transaction component of the evaluation conviction rating. All values are summed and divide by the number of records to calculate the initial overall evaluation certainty rating. Also the mean and median are calculated and compared.

At step 9-9, the final evaluation certainty rating is calculated by adjusting the initial rating according to four criteria: (1) if step 9-2 was consulted, subtract 5%; (2) if step 9-3 was consulted, subtract 5%; (3) if the final number of records used was less than 1000, subtract 10%; and (4) if in step 9-8 the mean is greater than the median, subtract the percentage of the median by which the mean was greater, but if mean was greater than the median, then add the percentage of the median by which the mean was less. Insofar as the certainty score is the single element of the recommendation data closest to a "summary view" in this embodiment of the invention, it will be considered by some as a recommendation either in favor of or against the action being evaluated. In fact, it can perform such a "black and white" function when a threshold certainty level is selected (either by the subscriber or by the system after reviewing user profile information, etc.) above which the system sends a recommendation in favor. It would be evident to those trained in the art that similar functions could be set up for the component scores, could be designed to vary based on transaction type or other criteria, etc. In addition, recommendations may be more complex, such as sending not just an evaluation score or scores but raising several issues associated with either the evaluation itself (e.g., limited data for conclusions, etc.) or with the object (e.g., abnormally high trading volume), then relying on the user to weigh the various elements of communication.

In one embodiment, transaction data may be assessed and then aggregated for evaluation in the following manner for all relevant investor actions numbered 1 to N and summed as:

$$\Sigma n \text{ certainty of evaluation} = \Sigma 1 \ldots n[\text{individual confidence}*(\text{individual competence} \times f \text{ individual competence})]*f \text{ transaction recency}.$$

Alternatively (or jointly), the evaluation may present the calculations of conviction and expertise separately to the user.

FIG. 9B illustrates the possible elements of an exemplary evaluation rules database 117. Again using merely one possible arrangement of a limited data set for purposes of simplifying illustration (in a manner that would be apparent to those skilled in the art, the number of variables read and calculated may be limitless, and rules in the database would be understood to increase exponentially from the number of variables).

Examples of evaluation rules components that might be employed include rule identification information (such as an ID number), a rule type designating its general assessment function (such as selection rule, expertise rule, conviction rule and certainty rule), a description of the function of the rule (essentially a shorthand reference for analysts, statisticians and programmers), rule operation (such as comparison criteria and mathematical operations to be performed) and rule history (such as author of the rule and its date of introduction to the database).

As with the assessment rules, the initial development and subsequent maintenance of evaluation rules may be achieved in a variety of ways and is largely determined in accordance with the process and architecture of the evaluation engine. In the linear process and architecture embodiment chosen here for illustration, the rules may be developed by a team of analysts and statisticians working with large data sets "offline" to identify key variables and build models using currently available tools and techniques (such as, SAS/STAT® and SPSS Regression Models®). In such a case, the models would be revisited regularly (while holding assessment processes constant) in order to refine the process for evaluating requests.

In alternative embodiments (such as the non-linear process and architecture referenced above), the evaluation rules may be evaluated and revised continuously or "online" (prior to and/or after "live" implementation) based on feedback loops that provide information regarding how much value each rule adds to the evaluation process. In yet another alternative embodiment, these "offline" and "online" approaches may be combined, such as using linear techniques to identify a broad set of possible key variables and then using non-linear techniques to adjust the "weight" each variable carries in the assessment.

It would be obvious to those skilled in the art that other manners of record selection, evaluation and weighting may be arranged to similar effect as the following example (such as simply retrieving all available records for evaluation but giving some such low "weights" in the evaluation as to render them insignificant).

Also as with the assessment rules, the automation of the evaluation process enables users skilled in the art to supervise the generation of an almost limitless number of evaluation rules and the trial application of those rules to historical data in order to gauge the value of each rule. Such "simulations" and consequent revisions are a key part of ensuring that rules stay attuned to the changing dynamics of the marketplace. Alternatively, multiple versions of rules may be maintained for separate or "parallel" administration in order to "horse race" the benefits of different approaches. In such a case, two different sets of rules may exist in a situation where only one is applied in any instance (where the determination of which rule to apply might be written into the rule and determined by a "random" element such as whether the last digit of the user ID is odd or even). In another embodiment, these approaches may be combined, identifying a subset of the rules (such as one rule type) to be administered randomly while the rest of the rules are regularly revised in the manner described above.

Once a set of rules is in place and the assessment process has been completed, the evaluation engine references the evaluation rules database in order to select the records according to the criteria established by the rules. In the example set forth here for illustration, the rules call for the selection of records (01-003) from the completed assessments database that are related to the evaluation request (by object, industry and/or action), are associated with users of high competence, are associated with users who have investment goals or styles similar to that of the subscriber making the evaluation request, are recent and are "open." The evaluation engine checks to see if it has a sufficient number of records to make a statistically valid evaluation (1000, in this example) and, if not, relaxes its standards of selection and retrieves additional records. In this manner, the assessments most relevant to the transaction being evaluated and the goals of the subscriber requesting the evaluation may have more influence in the evaluation.

The rules in this example then call for the calculation of an expertise rating based on the transaction competence assessment and associated user competence assessment, adjusting the influence or "weight" according to the criteria by which it was selected and the age of the transaction (rules 004-005). In this manner, users and transactions deemed more successful may have more influence in the evaluation.

Next, the rules in this example call for the calculation of an evaluation conviction rating based on the transaction trade level assessment, transaction confidence assessment, age of the transaction and action of the transaction (rules 006-007). In this manner, users and transactions deemed more confident may have more influence in the evaluation. Furthermore, inclusion of "opposite" actions (such as "short" actions when the evaluation is for a "buy" action) enables the evaluation process to incorporate not merely the competence and confidence of users who may be thought of as "agreeing" with the action being evaluated but to complement or balance that with the competence and confidence of users who may be thought of as "disagreeing" with the action.

The last stage in evaluation for the rules in the example provided is to calculate a certainty rating for the transaction based on the expertise and conviction ratings, adjusting the product of those two ratings based on the number of records used, and the looseness of the criteria by which the records were selected (008-009). Also in this example, the certainty rating is further adjusted based on the relationship between the mean and median of preliminary certainty ratings for each transaction, in this manner allowing for differences between ratings that are based on a wide distribution of transaction evaluations (such as a few very confident transactions by a few very competent users mixed with many less confident transactions by less competent users) and those that are based on a more narrow distribution of transaction evaluations (such as many somewhat confident transactions by many somewhat competent users). The evaluation engine concludes its process once all of the rules have been called and executed and all retrieved and calculated data have been updated as needed to the completed evaluations database 118, as well as the completed assessments database (for example, to note whether an assessment was used in a particular evaluation).

It is worth noting here that the evaluation process may weigh assessments both positively and negatively. In this manner, users and transactions deemed less competent and/or less confident may serve as components of the evaluation just as effectively as other users and transactions. For example, a user with a very low competence score who "disagrees" with the action being evaluated may actually increase the expertise, conviction and/or certainty scores of the evaluation.

In a related feature, the evaluation process and rules may be designed to weigh assessments based on whether a related evaluation has been provided by the system (which may be determined by referencing the communication database and completed evaluations database). In this manner, the system can provide two additional advantages. First, the system may assess instances of "non-action" in which, for example, an open buy transaction that has received a sell evaluation may be differentiated from an open buy transaction that has not received such an evaluation. Second, the system may limit or avoid altogether "self-reinforcing" feedback loops in which, for example, a stock is recommended because it was bought because it was recommended, etc.

Each of these components of the evaluation may themselves be a composite of other calculations. For example, investor confidence may be measured absolutely (e.g., in terms of dollars), relative to other information about that investor (e.g., percent of available dollars invested, rank order of transaction size vs. others in past), relative to information about other investors (e.g., rank order of transaction size vs. that of other investors made), or both (e.g., rank order of percent of dollars invested vs. that of other investors made in general and/or on this particular security). Investor competence may be measured similarly (e.g., absolute return on investment, change over time in returns on investments, rank order of return on investments vs. that of other investors, etc.), since subscribers may at times wish to know whose decisions have been "good" and may at other times simply wish to know whose decisions have been best.

Each of these composite components may themselves be composites of other calculations that are made separately for different areas of investor expertise such as the industry of the object being transacted (e.g., energy, finance), the market size of the object being transacted (e.g., large cap, mid-cap), the activity of the object being traded (e.g., high or low volumes), the volatility of the valuation of the object being traded (e.g., high beta, low beta), the time of the transaction relative to earnings announcements, the time of the transaction relative to the calendar year and any of several other areas defined either by publicly available information and/or proprietary variables determined by the process of the present invention. For other types of transactions, it would be evident that these areas of expertise might vary by the object, and therefore, the competence analysis could also vary. For example, gaming transactions might have aspects fo skill level (e.g., varying levels of professional and varying levels of amateur), sport (e.g., football, basketball, soccer, etc.), context importance (e.g., regular season, playoff, tournament, Olympics, etc.) or performer number (i.e., team size or individual).

More specifically, investor competence may be assessed both on an absolute historical level and/or with sensitivity (i.e., weighting) based on changes in performance over time if the investor appears to be getting better or worse at certain investment decisions. In addition, assessments of investor competence are dynamic, since the value of any action evaluated is changing constantly with the stock price; accordingly, the invention may provide updated evaluations of any request made in the past by the subscriber, and such updated evaluations may actually encompass broader data sets than were available at the time of the initial evaluation, thus providing an ongoing evaluation of all transactions represented in the user's portfolio. (Note that this feature is merely a different embodiment of the aforementioned functionality, since it is basically tantamount to the invention evaluating a transaction on each security in the portfolio.)

An advantage of this evaluation methodology is the ability to adjust (e.g., via evaluation weighting or direct adjustments to calculations) the certainty of evaluation according to investor transaction recency. In this context, recency may be assessed by any combination of time transpired since transaction, countering transactions (for example, if the investor has since sold some or all of an object purchased), object trading activity or changes that have occurred (or, often just as relevant, have not occurred) in the object price, along with other possible variables. This permits the use of comparatively "older" transactional data while allowing for changes that may have occurred, thereby dramatically extending the "useful life" of transaction data. While it is likely that much of the value provided by the invention will relate to subscribers acting quickly (for example, day traders who constantly monitor the markets and take frequent action or, by the same token, automated trading programs), the invention in this manner also provides a highly valuable source of information for the population of subscribers who invest for longer periods of time and with less frequent activity.

FIG. 10 shows exemplary records of a completed evaluations database, again using merely one possible arrangement of a limited data set for purposes of simplifying illustration. Given the function of the completed evaluations database, its components will be determined by the outputs (retrieved or calculated) of the evaluation engine. Thus, it is reasonable to expect not only that a number of the components of the completed evaluations database will be discovered during construction of the initial assessment and evaluation engine models, but also that the list of these components will continue to grow and change as the models themselves evolve and call for corresponding changes in the rules and/or engines.

In the example set forth here, components of the completed evaluations database might include evaluation identification information (such as an ID number), associated user information (such as user ID number and account number), request data (such as object, industry, action), market data (such as object status and trading volumes), evaluation engine calculations (such as expertise, conviction and certainty), historical information (such as the time and date of the evaluation and the set or "version" of evaluation rules consulted) and utilization information (such as whether the subscriber has received, reviewed and/or acted on the evaluation, which may be updated by communication and transaction processes to enable the system to track "charges" for the evaluations and may be referenced at later stages for updating the evaluation rules). In addition, a completed evaluations database might include "advisory" elements updated by the evaluation engine in order to indicate areas of possible concern, such as when an evaluation is based on a dangerously low sample size of transaction assessment records.

Completed evaluations may be sent immediately to the subscriber requesting the evaluation or may be stored for retrieval at a later time (in which case the subscriber might receive some other notification, such as an email or phone call, notifying them of the evaluation's availability). For purposes of illustration, the example here assumes that the evaluation is processed "real time" (that is, as soon as the subscriber submits the request and in merely a few seconds while the subscriber waits). In either case, the conclusion of the evaluation will be followed by one or more communications of recommendation information based on the evaluation data with the subscriber that requested the evaluation, which can be recorded in the communication database 119 and presented to the subscriber via interface 101.

FIG. 11 illustrates exemplary records of communication database 119. Although other data may be stored and the data may be arranged in a variety of ways, the process will be described here using this arrangement of a more limited data set for purposes of simplifying illustration. Examples of communication information that might be of use to the process include record identification elements (such as a unique ID), content elements (such as the type of communication and the ID of the evaluation or other system process generating communication), the recipient elements (the user ID and account ID of the subscriber receiving the communication), and transaction elements (such as the date and time of the communication).

Even though the above examples are mainly couched in terms of financial transactions, one having ordinary skill will readily understand that any type of transaction can be analyzed (e.g., assessed and evaluated) to generate reliable recommendation data. For example, in an alternative embodiment, gaming transactions may captured and analyzed. In such a system, a subscriber could propose a bet, and the present invention would analyze the transaction data of other gamblers, and determine the relevancy thereof, weight and model the data, and generate recommendation data regarding the bet, i.e., whether the execution of the bet would further the subscriber's stated betting style and objectives (of course, the betting style and objectives could simply be a desire to win).

One having ordinary skill will understand that transaction data may include gambling data from any source, and the system could be configured to consider an infinite number of variables to generate recommendation data.

FIGS. 12 and 13 show exemplary screens of user interface 101 presented to the subscriber for receiving communications from system 100. As with the example of FIG. 4, this example is merely one possibility of data, arrangement, medium and subscriber type made for purposes of simplifying illustration. Screen 1200 is an example of a main screen providing higher level functionality and data. Screen 1300 provides "drill down" data to the data shown in screen 1200.

In screens 1200 and 1300, several types of information may be presented to the subscriber including information from the request (such as object, industry and/or action to be evaluated), process identification information (such as evaluation ID, date and time), evaluation results (such as certainty score), status information (such as object price at time of evaluation), user messages (such as general advisories or alerts associated with the evaluation) and user instructions (such as how to interpret the certainty score). In addition, the subscriber may be presented with links to other places within the system (such as to submit a new request, to review old evaluations or to review detail associated with an evaluation) as well as to "outside" systems (such as links to online brokerage services or gaming sites).

One skilled in the art will fully understand that the user interface is preferably GUI and can be implemented with well known programming techniques.

Several options are preferably provided to the subscriber for sorting and viewing evaluation data in order to compare evaluations of different transactions. For example, a subscriber may request evaluations for all transaction types on a single object, or may request evaluations of buy transactions for all objects in a certain industry with a certain market capitalization. Similarly, the subscriber may request a list of evaluations with expertise and/or conviction above or below specified levels. The evaluation data may be displayed with the underlying transactional data to provide the subscriber a more complete view of the data.

This sorting feature may automatically generate and update rank-ordered lists according to different criteria that may be accessed by the subscribers without specific requests for evaluation. For example, the invention may maintain a list of all transaction evaluations with the highest expertise and/or conviction ratings for a certain industry, or a list of a specific transaction evaluations that are made for specific durations, or a list of all transaction evaluations above a certain expertise rating among investors with specific investment styles and objectives. Similarly, the invention may maintain a rank-ordered list of all investors according to their level of success over various periods of time and/or the current rate of change in their success. These dynamically maintained lists can present alternatives to the subscriber once a requested evaluation is completed. For example, upon presentation of the evaluation the invention may prompt the subscriber to view other transaction types for the same object or to view the same transaction type for other objects.

The user interface preferably includes functionality to allow the selection and comparison of different user transactions in both a traditional alphanumeric context (such as a table displaying the transaction type, object and evaluation scores) and a graphical context (such as a two-dimensional graph in which the transaction evaluations are located based on calculated expertise and conviction levels).

FIG. 14 illustrates a set of exemplary object characteristic records, which may be stored in a separate database or in any of the existing databases of the present invention already described. Table 1400 includes a object ID and name, and a plurality of characteristics. Of course, the number of characteristics is practically limited here, but could be limitless. Note that for different object types, the characteristics change. For example, the first two records are of stock types, which in this example, have only two object characteristics in addition to type and name—capitalization and industry. The gaming type object is a wager on a specific contest—the packers vs. bears NFL® game. This football game has the characteristics of type of contest (football), importance (playoffs), and a further limiting characteristic of conference (NFC).

The fourth record shows an example of a venture capital type object. This object includes the name of the company, the industry (Technology), a second industry or type of product (software), and the stage of funding (first round). Obviously, only a small set of characteristics are show, and limitless examples could be given here.

Thus, a number of preferred embodiments have been fully described above with reference to the drawing figures. Although the invention has been described based upon these preferred embodiments, it would be apparent to those of skilled in the art that certain modifications, variations, and alternative constructions would be apparent, while remaining within the spirit and scope of the invention.

I claim:

1. A computer-implemented method for generating a securities transaction recommendation to participants in a financial trading system, comprising steps of:

by a computer, receiving historical transaction data for a plurality of executed securities transactions over an electronic data network, the transaction data for each executed securities transaction including a security name, price of the security, industry of the security, total number of shares of the securities transaction, a type of the securities transaction and an identification of a party to the executed securities transaction and characteristics of that party;

receiving, by said computer, data for a proposed securities transaction, said data including security name, price, total number of shares, transaction type, industry of the security, identification of the party proposing the proposed securities transaction, and characteristics of the proposing party;

determining, by said computer, which executed securities transactions of said historical transaction data are relevant to said proposed securities transaction, the relevance being based on a match between one or more data elements of an executed securities transaction of said plurality of execution securities transaction with one or more corresponding data elements of the proposed securities transaction;

generating, by said computer, a confidence indicator for each executed securities transaction determined to be relevant, said confidence indicator being a percentage indicating relative aggressiveness associated with an executed securities transaction;

generating, by said computer, a conviction indicator, wherein said conviction indicator is an average of confidence indicators for each combination of a security and a party to the transaction for each executed securities transactions determined to be relevant; and generating, by said computer, a recommendation relating to said proposed securities transaction based on said transaction data of the executed securities transactions determined to be relevant to the proposed securities transaction, wherein said recommendation is generated by weighting each securities transaction of said securities transactions determined to be relevant based on at least a measured level of expertise of the identified party associated with the executed securities transaction and by weighting the executed securities transactions determined to be relevant based on the associated confidence indicator or the associated conviction indicator, and aggregating the weighted data.

2. The method as recited in claim 1, wherein said recommendation is generated by further weighting each securities transaction of said relevant executed securities transactions based on a similarity of the executed transaction type to the proposed transaction type, and aggregating the weighted data.

3. The method as recited in claim 1, wherein said recommendation is generated by further weighting each securities transaction of said relevant executed securities transactions based on a similarity of the relative size of the executed securities transactions to the relative size of the proposed transaction, and aggregating the weighted data by summing the weighted values of said relevant executed securities transactions, wherein the weighting is achieved by assigning a factor to the executed transaction determined by the degree of similarity of transaction size.

4. The method as recited in claim 1, wherein said recommendation is generated by further weighting each securities transaction of said relevant executed securities transactions based on a similarity of the company represented by the equity of the executed securities transaction to the company represented by the equity of the proposed securities transaction, and aggregating the weighted data by summing the weighted values of said relevant executed securities transactions, wherein the weighting is achieved by assigning a factor to the executed transaction determined by the degree of similarity of the companies, the greatest value being assigned in the case of the same company being the object of both transactions and the least value being assigned to companies that share no characteristics at all.

5. The method as recited in claim 1, wherein said recommendation is generated by weighting each securities transaction of said relevant executed securities based on a recency of the executed securities transaction relative to said proposed securities transaction, and aggregating the weighted data.

6. The method as recited in claim 1, wherein said recommendation is generated by further weighting each securities transaction of said relevant executed securities based on a similarity of the stated characteristics of the party of the executed securities transaction to the stated characteristics of the party of the proposed securities transaction, and aggregating the weighted data by summing the weighted values of said relevant executed securities transactions, wherein the weighting is achieved by assigning a factor to the executed transaction determined by the degree of similarity of characteristics, the greatest value being assigned to identical characteristics and the least value being assigned to opposite characteristics.

7. The method as recited in claim 1, wherein the historical data is kept confidential from participants.

8. The method as recited in claim 1, wherein at least one weighting is negative.

9. The method as recited in claim 1, wherein the recommendation includes an indication of certainty, which is based on at least one of the total number of relevant executed securities transactions identified, the degree of relevance of the relevant executed securities transactions identified, or the number of different parties associated with the relevant executed securities transactions identified.

10. The method as recited in claim 1, wherein said recommendation is generated by further weighting each securities transaction of said relevant executed securities based on the number of executed securities transactions by the transaction entity.

11. The method as recited in claim 1, wherein a transaction type is at least one of buy, sell, and short.

12. The method as recited in claim 1, wherein said recommendation is generated by weighting each securities transaction of said relevant executed securities transactions based on demonstrated characteristics of the party to the transaction, and aggregating the weighted data by summing the weighted values of said relevant executed securities transactions, wherein the weighting is achieved by assigning a factor to the executed transaction determined by the degree of similarity of characteristics, the greatest value being assigned to identical characteristics and the least value being assigned to opposite characteristics.

13. The method as recited in claim 1, further comprising a step of generating a competence indicator for each combination of a security and a party to the transaction for each executed securities transaction determined to be relevant, said competence indicator demonstrating relative demonstrated ability of the party to the executed securities transaction, said relative demonstrated ability of the party to the executed securities transaction being based on at least the number of transactions by the party involving that security and the gains or losses of the transaction by the party involving that security, greater values being assigned to combinations of the party and security that have greater numbers of transactions, greater gains, or some combination of greater numbers of transactions and greater gains associated with those transactions, lesser values being assigned to combinations of the party and security that have either lesser numbers of transactions, greater losses, or some combination of lesser numbers of transactions and greater losses associated with those transactions, and still lesser values being assigned to combinations of the party and security that have greater numbers of transactions and greater losses associated with those transactions wherein said recommendation is generated by weighting the executed securities transactions determined to be relevant by the associated competence score and aggregating the weighted data by summing the weighted values of said relevant executed securities transactions.

14. The method as recited in claim 1, wherein said confidence indicator is based on at least one of the size of the transaction relative to the executing party's total investment holdings at the time of transaction, the size of the transaction relative to the executing party's total cash available to invest at the time of transaction or the size of the transaction relative to the executing party's other executed transactions.

* * * * *